(12) United States Patent
Li et al.

(10) Patent No.: US 12,101,232 B2
(45) Date of Patent: Sep. 24, 2024

(54) DYNAMIC GRAPHING FOR MANAGING AN IT OPERATION SYSTEM

(71) Applicant: INTERNATIONAL BUSINESS MACHINES CORPORATION, Armonk, NY (US)

(72) Inventors: Jia Qi Li, Beijing (CN); Fan Jing Meng, Beijing (CN); Zhi Shuai Han, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 17/247,347

(22) Filed: Dec. 8, 2020

(65) Prior Publication Data
US 2022/0182294 A1 Jun. 9, 2022

(51) Int. Cl.
H04L 12/24 (2006.01)
G06F 16/901 (2019.01)
H04L 41/14 (2022.01)
H04L 41/22 (2022.01)

(52) U.S. Cl.
CPC .......... *H04L 41/22* (2013.01); *G06F 16/9024* (2019.01); *H04L 41/145* (2013.01)

(58) Field of Classification Search
CPC ... H04L 41/22; H04L 41/145; H04L 41/0893; H04L 41/12; H04L 41/142; G06F 16/9024

See application file for complete search history.

(56) References Cited

U.S. PATENT DOCUMENTS

| | | | |
|---|---|---|---|
| 8,683,389 B1 * | 3/2014 | Bar-Yam | G06F 16/2264 715/713 |
| 9,037,571 B1 * | 5/2015 | Baranowski | G06F 16/951 707/716 |
| 9,690,553 B1 | 6/2017 | Brodie | |
| 9,864,672 B2 * | 1/2018 | Seto | G06F 11/3466 |
| 10,198,281 B2 | 2/2019 | Thakkar | |

(Continued)

OTHER PUBLICATIONS

Disclosed Anonymously, "An interactive system for the automated workload discovery, visualization and analysis in complex IT environments," IP.com No. IPCOM000258375D, Publication Date: May 6, 2019, 10 pages.

(Continued)

*Primary Examiner* — Cesar B Paula
*Assistant Examiner* — Zelalem Shalu
(74) *Attorney, Agent, or Firm* — Caleb D. Wilkes

(57) ABSTRACT

A method, computer system, and a computer program product are provided for dynamic viewing of an operation graph depicting a distributed workload in an Information Technology system. A list may be received as input and may include selected nodes. A sub-graph may be abstracted from a global graph. The sub-graph and the global graph may depict interactions among ops objects of the distributed workload using nodes and edges. First nodes may be removed from the global graph according to the list. Direct edges between remaining nodes from the global graph may be maintained. A first indirect edge may be generated based on the removed first nodes. The first indirect edge may run between a first remaining node and a second remaining node. The sub-graph may be presented removed from the global graph.

20 Claims, 13 Drawing Sheets

(56) References Cited

U.S. PATENT DOCUMENTS

| | | | |
|---|---|---|---|
| 10,230,582 B2 | 3/2019 | Billore | |
| 11,257,263 B1* | 2/2022 | Al Khafaji | G06T 3/40 |
| 2005/0021736 A1* | 1/2005 | Carusi | H04L 67/62 |
| | | | 709/224 |
| 2005/0235248 A1* | 10/2005 | Victoria | G06F 8/73 |
| | | | 717/102 |
| 2007/0266039 A1* | 11/2007 | Boykin | G06Q 10/06 |
| | | | 707/999.102 |
| 2011/0249002 A1* | 10/2011 | Duplessis | G06T 11/206 |
| | | | 345/440 |
| 2017/0255711 A1* | 9/2017 | Bingham | G06F 11/3024 |
| 2020/0036595 A1* | 1/2020 | Wallerstein | H04L 41/12 |

OTHER PUBLICATIONS

Disclosed Anonymously, "Method and System for System Dependency Extraction for IT Operation System," IP.com No. IPCOM000262621D, Publication Date: Jun. 16, 2020, 5 pages.

Mell et al., "The NIST Definition of Cloud Computing", National Institute of Standards and Technology, Special Publication 800-145, Sep. 2011, 7 pages.

Author Not Known, "Named-entity recognition", article/entry from Wikipedia, Retrieved from Internet on Dec. 7, 2020: <https://en.wikipedia.org/wiki/Named-entity_recognition>, 7 pages.

* cited by examiner

```
1  {
2    "_index": "dialog",
3    "_type": "doc_",
4    "_id": "3fDc92oBn_qnNMTcQ65o",
5    "_version": 1,
6    "_score": null,
7    "_source": {
8      "node": "kube-wdc06-cr3be7374a31234596a0b3891646511110-w82/n",
9      "_logtype": "json",
10     "transaction_id": "7514173bc2786d7567107dacb47cdd03",
11     "host": "ga-dialog-7f56cb8d76-m2x22",
12     "pod": "ga-dialog-7f56cb8d76-m2x22",
13     "_ip": "169.60.103.42",
14     "_tag": [
15       "agent-v2-ga",
16       "prdwat-us-east-mzr-cruiser2"
17     ],
18     "timestamp": "2019-05-21T05:12:30.005Z",
19     "app": "DialogV2",
20     "_line": "{\"app\":\"DialogV2\",\"msg\":\"Request in applyModel for tenant_id [6ddd2267-adb9-4b6d-a94f-8205ba...
              , and transaction_id [7514173bc2786d7567107dacb47cdd03].\",\"level\":\"INFO\", \"logger\":\"DialogLogger...
              ,\"tenand_id\":\"6ddd2267-adb9-4b6d-a94f-8205ba41ddd6:us-east\",\"workspace_id\":\"53372fb7-54b4-4dde...
              ,\"conversation_id\":\"64335230-e58f-4235-a87a-b42d71eb14aa\",\"litelinks_service_name\":\"voyager...}",
21     "_host": "ga-dialog-7f56cb8d76-m2x22",
22     "_file": "/var/log/containers/ga-dialog-7f56cb8d76-m2x22_conversation_dialog-e2e5d448cc92d9fe272ae...log",
23     "thread": "ll-server-thread-53",
24     "logger": "DialogLogger.DialogRuntimeMaster",
25     "elapsed_time_ms": 0,
26     "_bid": "f1c5975c-279-4e28-87e8-07b3f0340a34:28253:ld68",
27     "litelinks_service_name": "voyager-dialog",
28     "revision_id": "899235022995159447",
29     "namespace": "conversation",
30     "_app": "dialog",
31     "container": "dialog",
32     "workspace_id": "53372fb7-54b4-4dd3-871a-da8b6f708531",
33     "msg": "Request in applyModel for tenant_id [6ddd2267-adb9-4b6d-a94f-8205ba41ddd6:us-east] with Litelinks...
              {7514173bc2786d7567107dacb47cdd03}.",
34     "level": "INFO",
35     "containerid": "e2e5d448cc92d9fe272ae792cfc52a4156a4062e5dba1d6a4487d1724809c943",
36     "_ingester": "agent",
37     "tenant_id": "6ddd2267-adb9-4b6d-a94f-8205ba41ddd6:us-east",
38     "_key": "logline:a6fddb4889:dialog:ga-dialog-7f56cb8d76-m2x22:ld68",
39     "_cluster": "ld68",
40     "_label": {
41       "component": "dialog",
42       "date": "2018-11-11T002022-UTC",
43       "slot": "ga",
44       "tenant": "PUBLIC",
45       "service": "conversation",
46       "pod-template-hash": "7f56cb8d76"
47     },
48     "@timestamp": "2019-05-21T13:12:34",
49     "_account": "a6fddb4889",
50     "conversation_id": "64335230-e58f-4235-a87a-b42d71eb14aa",
51     "api_version": "2018-09-20"
52   },
53   "fields": {
54     "api_version": [
55       "2018-09-20T00:00:00.000Z"
56     ],
57     "@timestamp": [
58       "2019-05-21T13:12:34.000Z"
59     ],
60     "timestamp": [
61       "2019-05-21T05:12:30.005Z"
62     ]
63   },
64   "sort": [
65     1558444354000
66   ]
67 }
```

FIG. 8

DYNAMIC GRAPHING FOR MANAGING AN IT OPERATION SYSTEM

BACKGROUND

The present invention relates generally to the field of managing Information Technology (IT) and to managing distributed workloads in an IT environment.

SUMMARY

According to one exemplary embodiment, a method for dynamic viewing of an operation graph depicting a distributed workload in an IT system is provided. A list may be received as input and may include selected nodes. A sub-graph may be abstracted from a global graph. The sub-graph and the global graph may depict interactions among ops objects of the distributed workload using nodes and edges. First nodes may be removed from the global graph according to the list. Direct edges between remaining nodes from the global graph may be maintained. A first indirect edge may be generated based on the removed first nodes. The first indirect edge may run between a first remaining node and a second remaining node. The sub-graph may be presented removed from the global graph. A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings ae not to scale as the illustrations are for clarity in facilitating one skilled in the art in understanding the invention in conjunction with the detailed description. In the drawings:

FIG. 8 illustrates raw data that has been pre-processed according to at least one embodiment;

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a computer system, method and computer program product for dynamic graphing. The present embodiments have the capacity to improve the technical field of site reliability engineering for IT infrastructure and operations by helping users more easily see and deliberate regarding particular aspects of a distributed workload of an IT system. The present embodiments help a user perform improved graphing to gain a greater understanding of the distributed workload in a hybrid cloud environment, where the workloads are distributed across the cloud. Such distributed workloads ae traditionally not easily viewable and understandable for analysts and for site reliability engineers (SREs). Without requiring a system user to have domain expertise or advanced site reliability engineering knowledge, the present embodiments help achieve automatic construction of a temporal operations graph that depicts various types of correlations, e.g., logical and physical correlations, and interactions among operations objects to allow greater understanding and control of information technology, whether a developer, back-end user, or system administrator is the viewer. The present embodiments may facilitate dynamic topology discovery, system problem diagnosis, fault localization, and/or application modernization.

Figure 1:
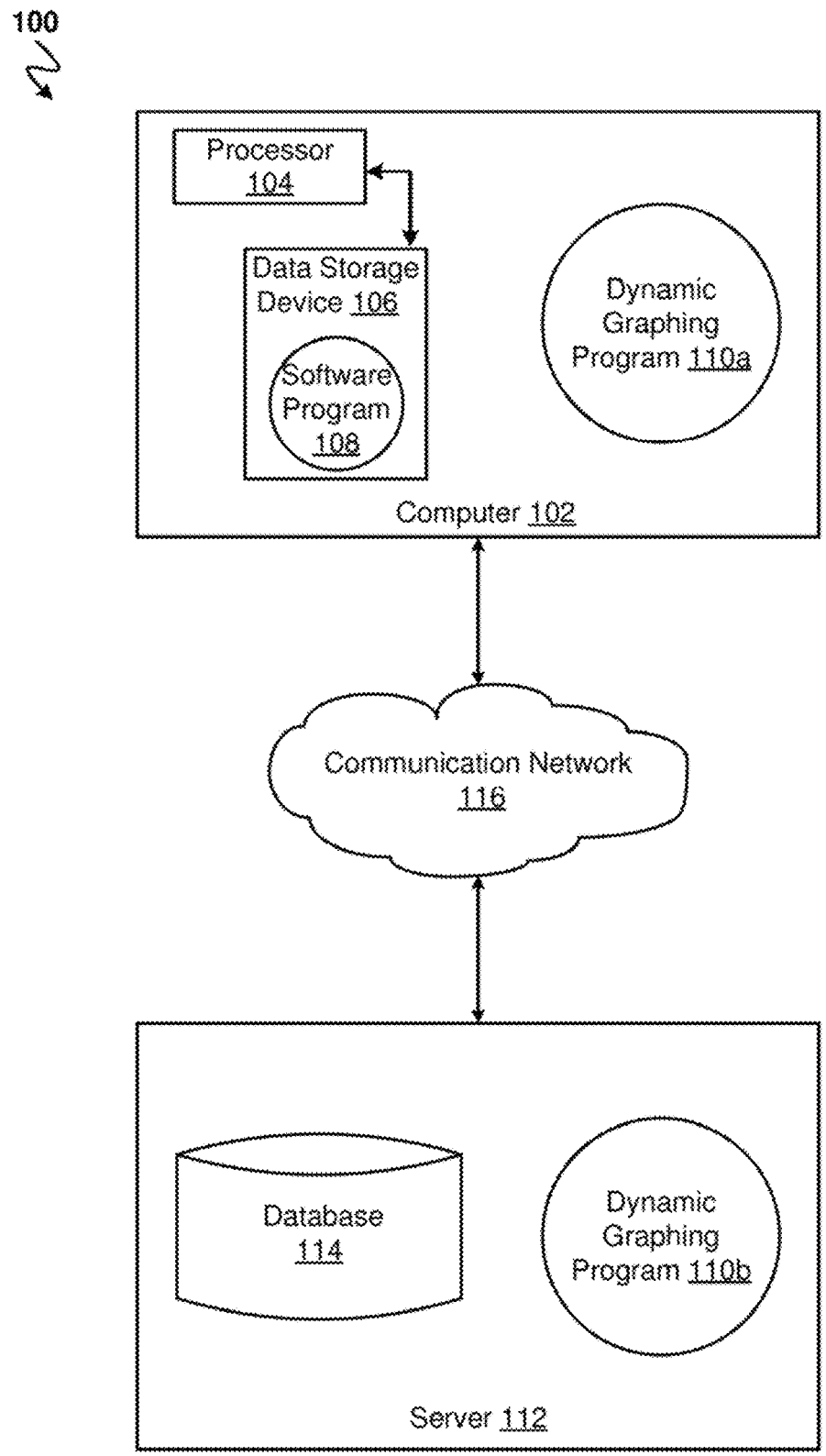
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 106 and a dynamic graphing program 110*a*. The networked computer environment 100 may also include a server 112 that is enabled to run a dynamic graphing program 110b that may interact with a database 114 and a communication network 116. The networked computer environment 100 may include a plurality of computers 102 and servers 112, although only one of each is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 9, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dynamic graphing program 110a, 110b may interact with a database 114 that may be embedded in various storage devices, such as, but not limited to a computer/mobile device 102, a networked server 112, or a cloud storage service.

Businesses that use hybrid clouds for IT may experience difficulty in analyzing their operations and operations layers, because the hybrid cloud may distribute the workload across multiple levels or components within the cloud. This distribution makes it difficult to understand the inner correlations between different operations entities (ops entities) within the distributed workload for a business or organization. An ops entity is a type of an object in an IT system or in an IT environment from a business viewpoint, an application level, or an infrastructure and about which data can be collected and stored. The correlations among operations objects (ops objects) within a distributed workflow may be complex and dynamic. SREs have ability to study and better understand such a distributed workload but need substantial effort and extenuation to manually connect operation data from the distributed workload from the entire IT environment seamlessly and efficiently. In a distributed workflow for a business or other organization, a huge amount of operation data may be present. Analysis and management of different operation data may vary for different scenarios such as for system abstraction, business statistical analysis, pattern mining, operation correlation, and deployment management. Real-time data for business patterns, requests and services, and infrastructure deployment may be diverse and require flexible system programs that facilitate the presenting and viewing of data in an understandable way to enhance maintenance and operations improvement of the IT system.

The present embodiments may help a user gain a greater understanding of a specific aspect or a combination of aspects of the distributed workload, e.g., of an upper layer, an intermediate level, or an infrastructure level of a system. The upper layer may include operations objects such as a user, a request made by a user, or a host. The intermediate level may include services or applications that are called by a request. The infrastructure level may indicate the locations of the services and on which hosts containers are run.

According to the present embodiment, a user using a client computer 102 or a server computer 112 may use the dynamic graphing program 110a, 110b (respectively) to dynamically abstract a sub-graph from a global graph that depicts a distributed workload in an IT environment. The dynamic graphing method is explained in more detail below with respect to FIG. 2, FIG. 3, FIG. 4, FIG. 5, FIG. 6A, FIG. 6B, FIG. 6C, FIG. 7A, FIG. 7B, FIG. 7C, and FIG. 8. The dynamic graphing program 110a, 110b may help a user better understand a distributed workload in a hybrid cloud, which will lead to improved system analysis and system management.

Figure 2:
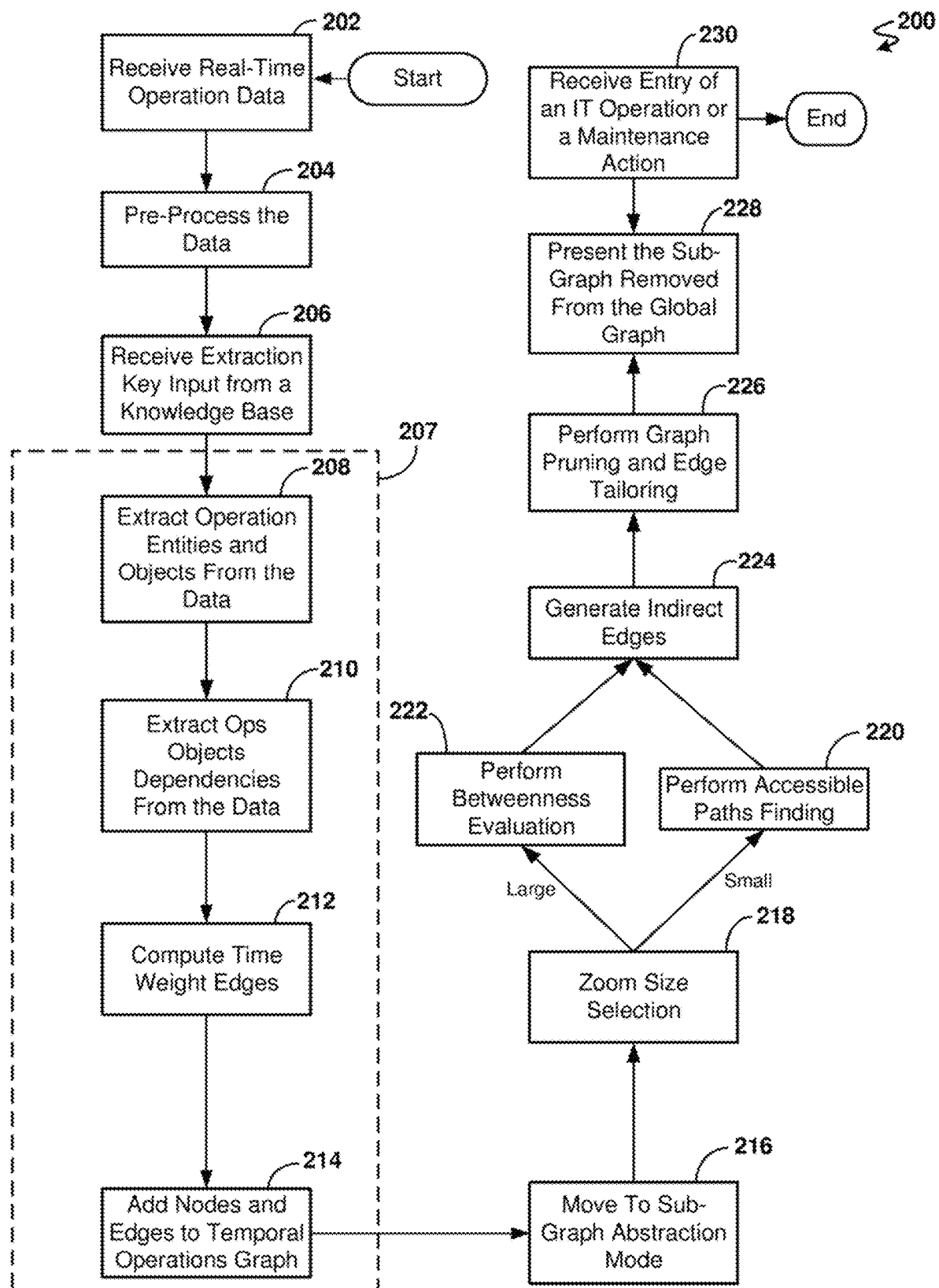
FIG. 2 illustrates an operational flowchart for a process for dynamic viewing of an operational graph depicting a distributed workload in an IT system according to at least one embodiment.

Referring now to FIG. 2, an operational flowchart illustrates the dynamic graphing process 200 used by the dynamic graphing program 110a, 110b according to at least one embodiment.

In step 202 of the dynamic graphing process 200 shown in FIG. 2, real-time operation data is received. In at least one embodiment, the real-time operation data from the distributed workload may be JSON files. A JSON file stores simple data structures and objects in JavaScript Object Notation (JSON) format, which is a standard data interchange format. The format includes text. These JSON files may be transmitted through the communications network 116 and may be received by the server 112. These files may be sent from the distributed workload or from components of the distributed workload of a hybrid cloud system. JSON files may be used for transmitting data between a web application and a computer server, e.g., server 112. The data objects of the JSON files include attribute-value pairs or key-value pairs and array data types. In other embodiments, other real-time operation data such as Extensible Markup Language (XML) files, YAML Ain't Markup Language (YAML) files, Tom's Obvious, Minimal Language (TOML) files, or Cursive Script Object Notation (CSON) files may be received. The real-time operation data may include logs, tickets, and monitoring metrics of objects in the distributed system.

In step 204 of the dynamic graphing process 200 shown in FIG. 2, the real-time operation data that was received in step 202 is pre-processed. The pre-processing may occur by arranging each log or data entry into consistent rows or columns. For example, for real-time operation data that is part of a JSON file the pre-processing may include arranging the data to have a key-value pair format with entity types listed in a first column and individual names of the respective entity listed in a second column that is adjacent to the first column. The data pre-processing may include transformation, cleaning, selection, instance selection, normalization, and feature extraction of the real-time operation data that is received in step 202.

In step 206 of the dynamic graphing process 200, extraction key input from a knowledge base is received. A memory associated with the dynamic graphing program 110a, 110b may store this knowledge base which may include information about the distributed system of a hyper-cloud in which the system to be analyzed operates. Knowledge from SREs who maintain the system may be input into a computer, e.g., into the computer 102, as data and that data may be transmitted via the communication network 116 for storage in the database 114 of the server 112. The data stored in this knowledge base may relate to known operations entities or objects that are used in the system such as particular users and hosts. Such data may be stored in lists in the knowledge base. The data stored may relate to services or applications that are used or implemented in the system. The data stored may relate to hosts and containers for the system.

Figure 6A:
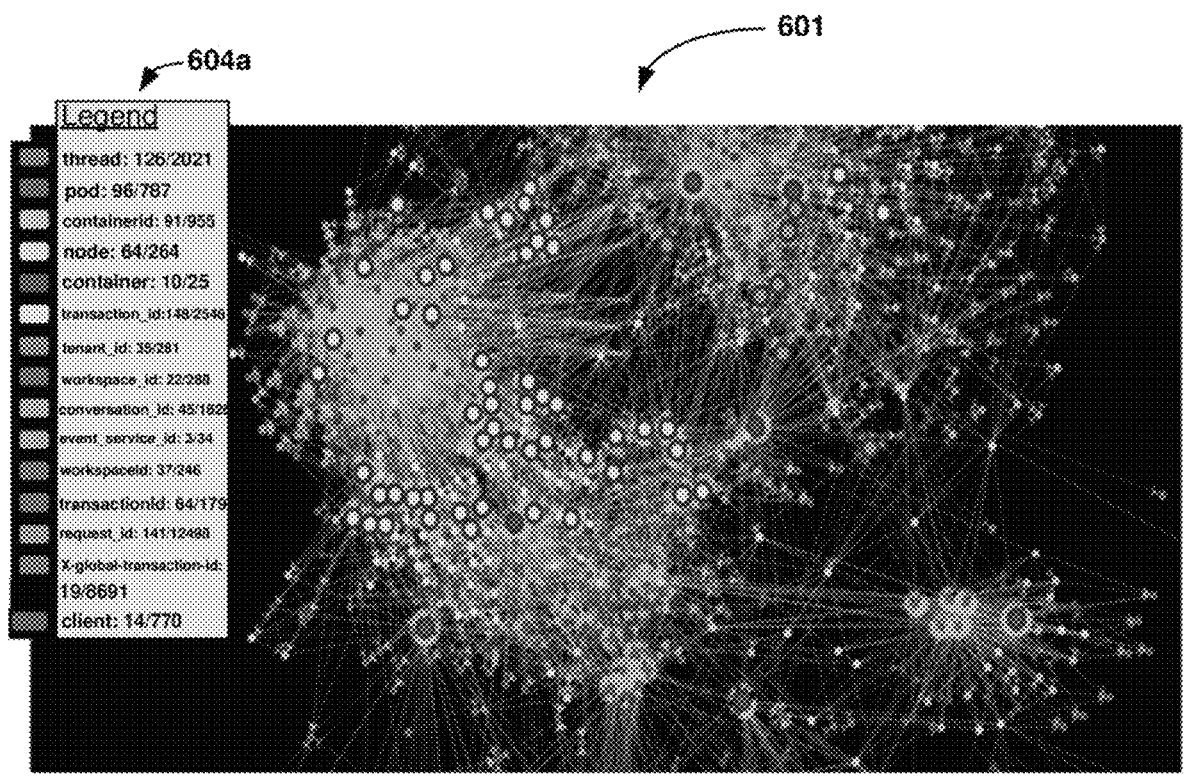
FIG. 6A illustrates a graphics display that is displaying a first global graph according to at least one embodiment.

Process 207 encompasses the subsequent steps 208, 210, 212, and 214 and refers to construction of a temporal operations graph. Thus, process 207 will be explained through its sub-steps, namely steps 208, 210, 212, and 214. FIG. 6A to be described subsequently shows an example of a global graph which is a temporal operations graph according to at least some embodiments and which is an example of the result of process 207.

In step 208 of the dynamic graphing process 200 shown in FIG. 2, operations entities and operations objects are extracted from the raw data that was received in step 202 and that was pre-processed in step 204. This extraction process performed in step 208 is shown in mom detail in FIG. 3 as ops entity/object extraction process 300 and which is described subsequently.

In step 210 of the dynamic graphing process 200 shown in FIG. 2, ops objects dependencies are extracted with respect to the ops objects that are extracted in step 208. This extraction of dependencies may also be done from the raw data that was received in step 202 and that was pre-processed in step 204. This extraction process performed in step 210 is shown in more detail in FIG. 4 as dependency extraction process 400 which is described subsequently. The extracted dependencies may describe the behaviors of the ops objects. These dependencies may be represented as edges running between nodes in the global graph and sub-graph. For example, a user may generate a request, so in a graph that is to be generated an edge will run from a node designating the user to another node designating the request. Another node may represent a service and yet another node may represent a host. The service will rest on the host, so in the generated graph an edge runs from the service node to the host node and points to the host node.

In step 212 of the dynamic graphing process 200 shown in FIG. 2, time weight edges are computed. The temporal operations graph that is generated through the process 207 may be a global graph that includes nodes representing ops objects of the distributed system. The global graph may also include edges that connect the various ops objects nodes that are dependent on one another. These edges represent the ops object dependencies that are extracted in step 210 and in the dependency extraction process 400. The graph that is generated may be a directed graph in which the edges are associated with a direction which may be indicated by an arrowhead at the end, at a mid-region, or at a beginning of a line or of an edge that connects two nodes in the global graph. For two nodes in the graph that are connected to each other via an edge, the arrow in the edge pointing from a first of those nodes to the second of those nodes indicates a dependency that the operations object represented by the first node may be performed before the operations object represented by the second node during typical operations of the distributed workload.

Figure 7A:
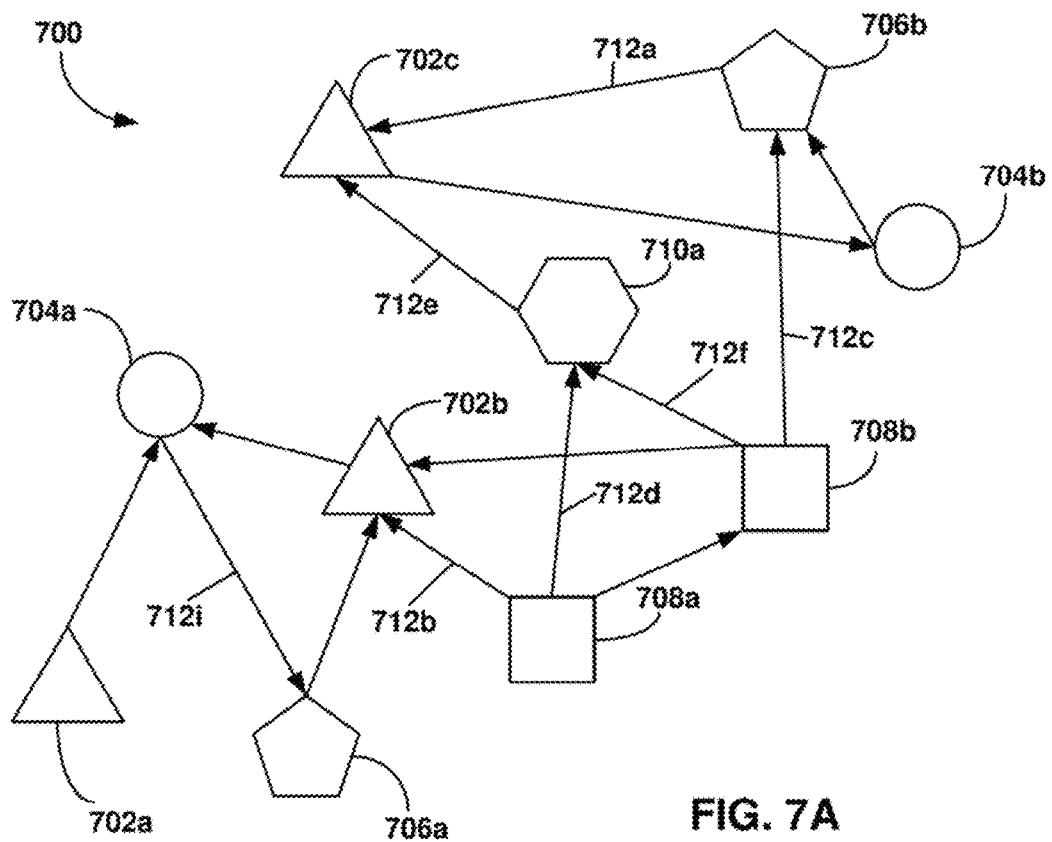
FIG. 7A illustrates a small global graph according to at least one embodiment.
Figure 7B:
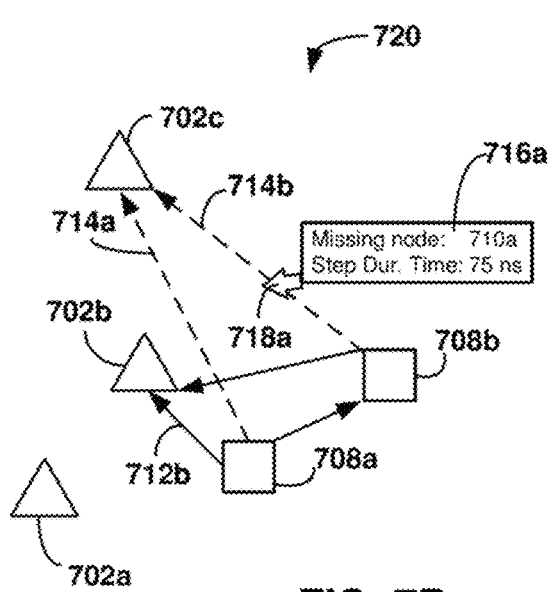
FIG. 7B illustrates a sub-graph abstracted from the small global graph of FIG. 7A according to at least one embodiment.

The time weight of each edge may represent the duration of time between the second node ops object being performed and the first node ops object being performed. This time weight for each edge may be illustrated in the global graph via a length of the edge or may be indicated in a pop-up graphic that may be generated and shown on a computer display when a user scrolls the cursor over a particular edge in a global graph or in a sub-graph. FIG. 7B shows an example of such a pop-up graphic with the first pop-up graphic 716a. When a user interacts with an interface to drag a first cursor 718a over the second indirect edge 714b, then the first pop-up graphic 716a is generated and shown indicating a step duration time of 75 ns for the workload action to proceed from the second service node 7086b to the third request node 702c. The computation for step 212 may be performed by comparing timestamps for an operations action associated with the first node as compared to an operations action associated with the second node. This comparison may include a subtraction of the time when the operations action for the second node occurs from the time when the operations action for the first node occurs.

In step 214 of the dynamic graphing process 200, nodes and edges are added to a temporal operations graph. A graphics program, e.g., a three-dimensional or two-dimensional graphics program, may be used to apply the nodes and edges determined in steps 208, 210, and 212 into a graph together. A node for each operations object and an edge for each operations object dependency may be entered into the graph. This comprehensive graph may be referred to as a global graph. FIG. 6A illustrates a first global graph 601 which will be described subsequently. The dynamic graphing program 110b at the server 112 may include this graphics generation capability and may automatically enter the nodes and edges into the graph after the dynamic graphing program 110a, 110b performs the ops object extractions, the objects dependency extractions, and/or the time weight edge computations.

Figure 6B:
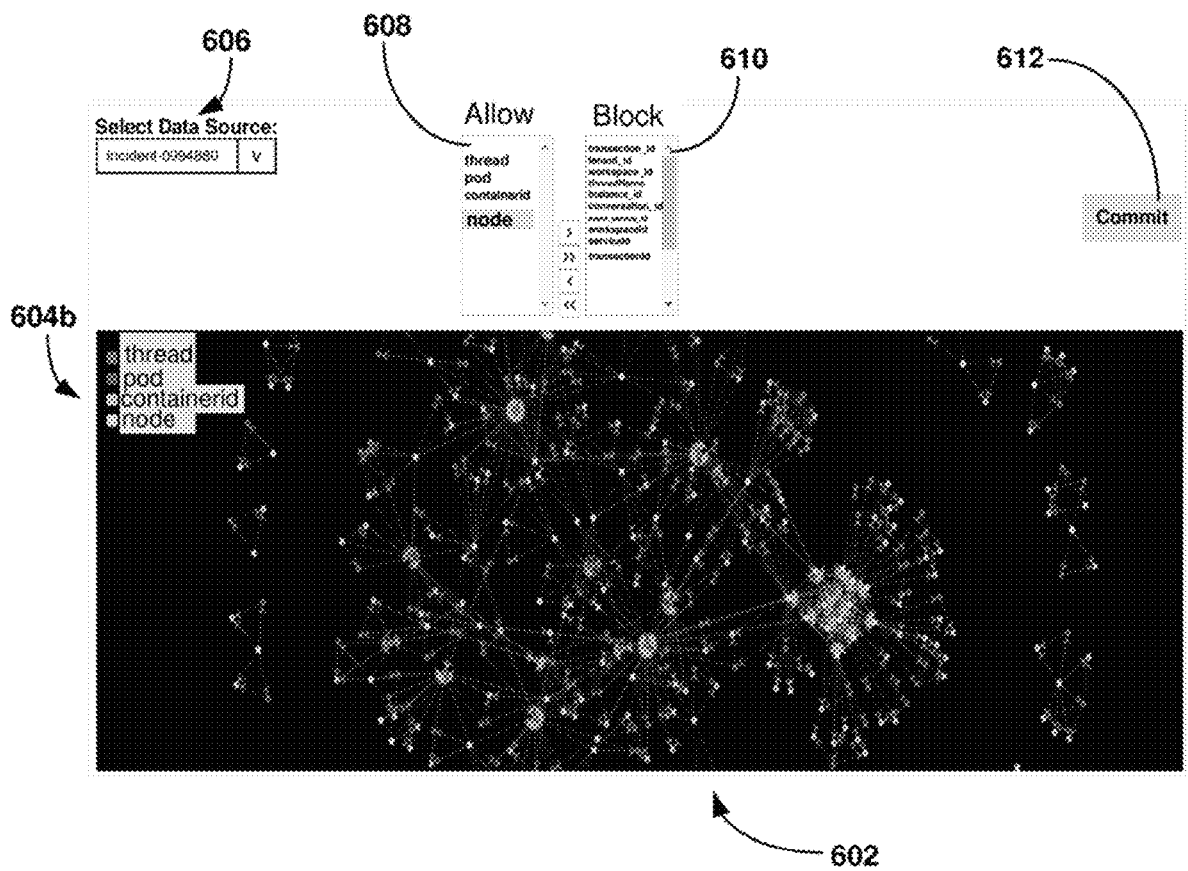
FIG. 6B illustrates a graphics display, a user interface for abstracting a sub-graph from a global graph, and a first sub-graph that according to at least one embodiment has been abstracted from the first global graph shown in FIG. 6A.

In step 216 of the dynamic graphing process 200 shown in FIG. 2, the operation moves to sub-graph abstraction mode. FIG. 6A shows an image of a graphics program that the dynamic graphing program 110a, 110b may generate and display on a screen of a computing device, e.g., of the computer 102. In the display, a first global graph 601 is shown. FIG. 6B shows a user interface that is displayed that includes additional interactive display elements which allow a user to make selections for generating a sub-graph and to actuate the sub-graph generation. Thus, with the display and with the user interface, a user may provide input that allows a sub-graph to be generated that shows the components that are of interest to the user.

In step 218 of the dynamic graphing process 200 shown in FIG. 2, a zoom size is selected for the temporal operations graph that was created via the process 207. The zoom size may affect an abstraction strategy to be undertaken by the dynamic graphing program 110a, 110b. A user interface presented to the user, e.g., via a display or screen of the computer 102, may include a graphical user interface (GUI) component via which a user may select a zoom size for the sub-graph that is to be generated. Such GUI component may present two zoom size options to the user—namely, a large or small size. In other embodiments, such GUI component may present more than two options to the user, e.g., a small, medium, or a large zoom size. The selection of zoom size for step 218 may also be done via the dynamic graphing program 110a, 11b calculating the total number of nodes for the sub-graph after the user inputs into an allow list or into a block list which nodes are to be kept for the sub-graph and which nodes from the global graph are to be removed for the generation of the sub-graph. A determination of a large zoom size or a small zoom size may be made using a threshold number that is stored in a memory associated with the dynamic graphing program 110a, 110b, e.g., that is stored in the database 114. A threshold number of twenty may be used, with the twenty referring to twenty total nodes for the sub-graph. Thus, a sub-graph with more than twenty nodes may be considered a large zoom size and a sub-graph with less than twenty nodes may be considered a small zoom size. In some embodiments, a user could enter a preference to be stored by the dynamic graphing program 110a, 11b for the specific zoom size threshold number that is desired by the user.

If a small zoom size is selected in step 218, then in step 220 accessible paths finding is performed. Accessible paths finding is shown in more detail in FIG. 5 and in comparing FIGS. 7B and 7C to FIG. 7A which are described subsequently. The dynamic graphing program 110a, 11b may perform the accessible paths finding starting from the global graph and using the block list and allow list information as input.

If a large zoom size is selected in step 218, then in step 222 a betweenness evaluation is performed, e.g., by the dynamic graphing program 110a, 110b. The betweenness or betweenness centrality that is evaluated may be a measure of centrality in a graph based on shortest paths. For every pair of vertices in a connected graph, at least one shortest path exists between the graph nodes such that either the number of edges that the path passes through for unweighted graphs or the sum of the weights of the edges for weighted graphs is minimized. The betweenness centrality for each vertex is the number of these shortest paths that pass through the vertex.

Figure 7C:
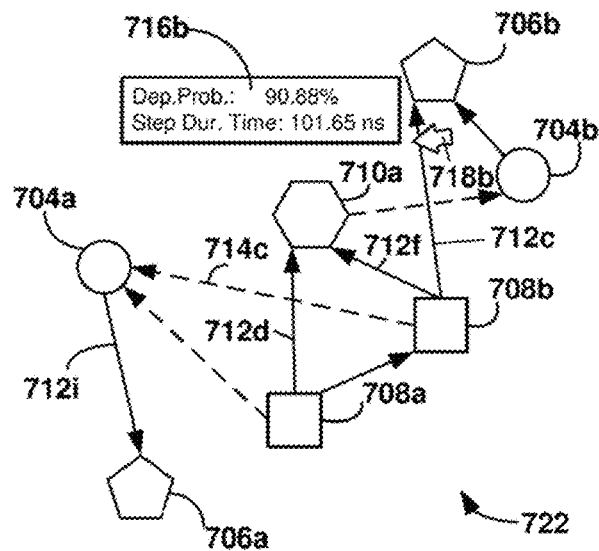
FIG. 7C illustrates another sub-graph abstracted from the small global graph of FIG. 7B according to at least one embodiment.

After the performance of either step 220 or step 222, step 224 is performed and includes generating indirect edges. The dynamic graphing program 110a, 110b may learn via the steps 220 or 222 which direct nodes from the global graph are suitable for replacement in the sub-graph by an indirect edge. FIGS. 7B and 7C show examples of some indirect edges. In FIG. 7B, a second indirect edge 714b is labeled and was used to replace a first transaction node 710a that was present in the first small global graph shown in FIG. 7A. In at least some embodiments, the indirect edges that are generated may have a presentation form, e.g., a second presentation form, that is different from the presentation form, e.g., a first presentation form, of the direct edges. For example, as shown in FIGS. 7B and 7C the indirect edges including the first, second, and third indirect edges 714a, 714b, and 714c, respectively, are dotted lines while the direct edges including the second direct edge 712b shown in FIG. 7B and the first direct edge 712a shown in FIG. 7A are shown as solid lines. Thus, with the different presentations of the different edge types, a user of the dynamic graphing program 110a, 110b may be able to more quickly recognize and understand the inner correlations of certain components of a distributed workload. The first pop-up graphic 716a shown in FIG. 7B may also provide information about a missing node, e.g., a node that was present in the global graph, e.g., in the first small global graph 700, that is not present in the abstracted sub-graph, in this instance the first small sub-graph 720. Specifically, in this example the first pop-up graphic 716a indicates that the second indirect edge 714b helps replace the first transaction node 710a which was removed from and not included for the abstraction of the first small sub-graph 720. The first pop-up graphic 716a provides information about an original accessible path between nodes that was in the global graph.

In step 226 of the dynamic graphing process 200 shown in FIG. 2, graph pruning and edge tailoring are performed for the sub-graph. Certain nodes that are in the block list or that ae not on the allow list may be pruned from the global graph for the generation of the sub-graph. Edges that are directly connected to such nodes may also be pruned. Edges and nodes that are not within any accessible path of the sub-graph nodes may be pruned, e.g., deleted, for transforming the global graph to make the sub-graph. The dynamic graphing program 110a, 110b may perform this pruning. The edge tailoring may include the dynamic graphing program 110a, 11b replacing two connected direct edges from the global graph, and the node that connects these two direct edges, with one indirect edge for the sub-graph, depending on the accessible paths finding or on the betweenness evaluation. Non-dependent relations in the graph may be tailored.

Figure 9:
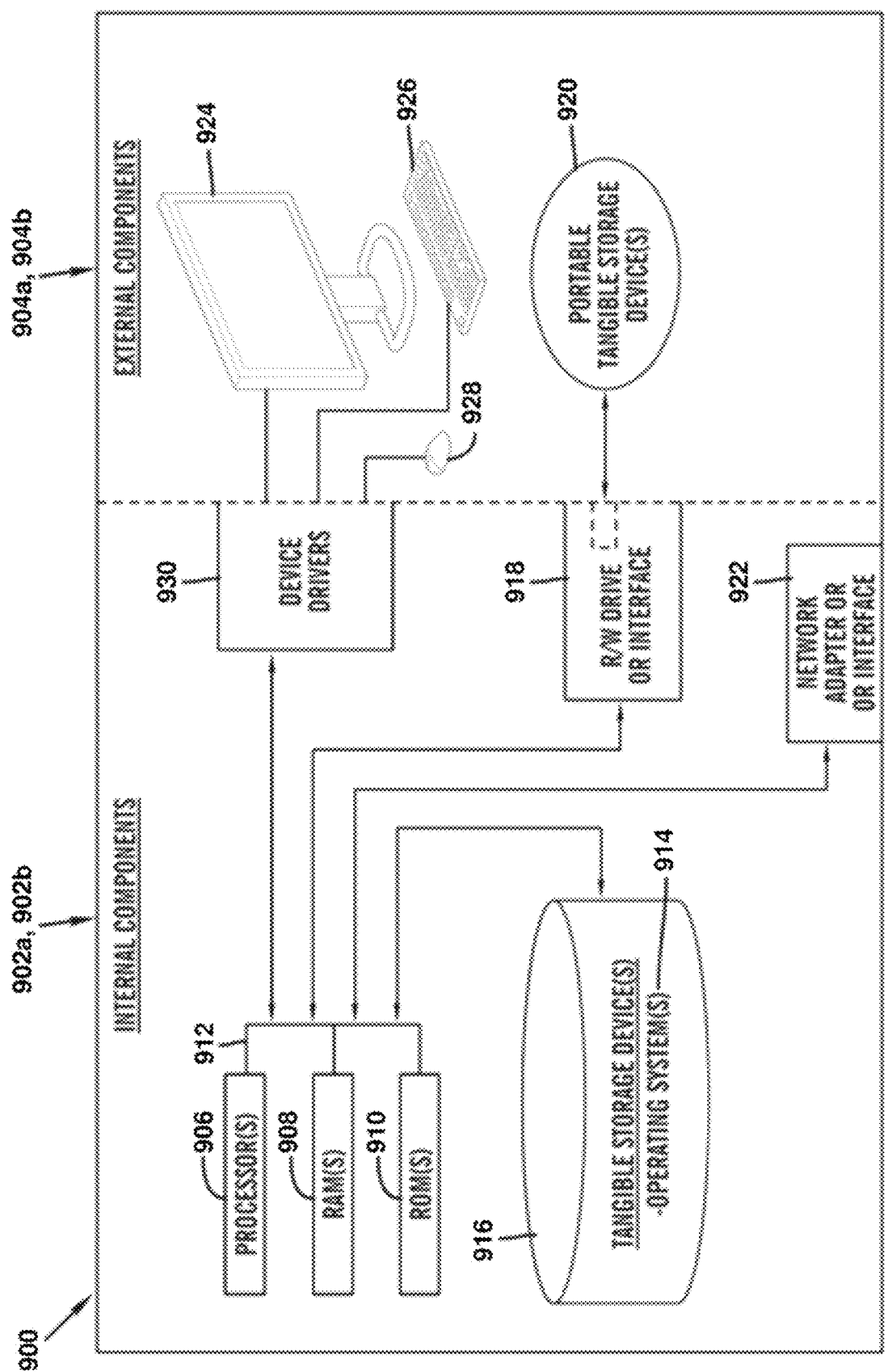
FIG. 9 is a block diagram of internal and external components of computers and servers depicted in FIG. 1 according to at least one embodiment.

In step 228 of the dynamic graphing process 200 shown in FIG. 2, the sub-graph that was removed from the global graph is presented. The sub-graph may be presented on a display of a computer, e.g., on a display or screen of the computer 102, e.g., on the computer display monitor 924 that is shown in FIG. 9. FIGS. 7B and 7C show examples of a sub-graph, namely a first small sub-graph 720 in FIG. 7B and a second small sub-graph 722 in FIG. 7C, that may be presented according to step 228. As is shown as examples in FIGS. 7B and 7C, the first small sub-graph 720 and the second small sub-graph 722 are shown removed from remaining portions of the first small global graph 700 from which these two sub-graphs were generated. Certain nodes and edges from the first small global graph 700 are not present in the first small sub-graph 720 and are not present in the second small sub-graph 722.

In step 230 of the dynamic graphing process 200 shown in FIG. 2, an entry of an IT operation or a maintenance action is received. By viewing the sub-graph via the presentation in step 228, a user may obtain greater system knowledge or understanding which leads to the user taking an action to perform maintenance on or operate the distributed workload system. The user may enter this action via an input device, e.g., at the keyboard 926, of the computer 102. FIG. 9 shows an example of the keyboard 926. The dynamic graphing program 110b may receive the input that is received at the computer 102 via a transmission through the communication network 116. The dynamic graphing program 110a, 110b may forward this operation or maintenance command to other components within the distributed workload and may, if necessary, update the global graph or the sub-graph to reflect any changes in the component relationships that may be changed via the operation or maintenance. The IT operation or maintenance action may include deletion in the distributed workload of a component corresponding to a node of the global graph, e.g., of an unattached node. The IT operation or maintenance action may include entry of a migration plan for migrating data from certain components within the distributed workload. The IT operation or maintenance action may include entry of a clustering recommendation for operating certain system components together in a cluster.

Figure 3:
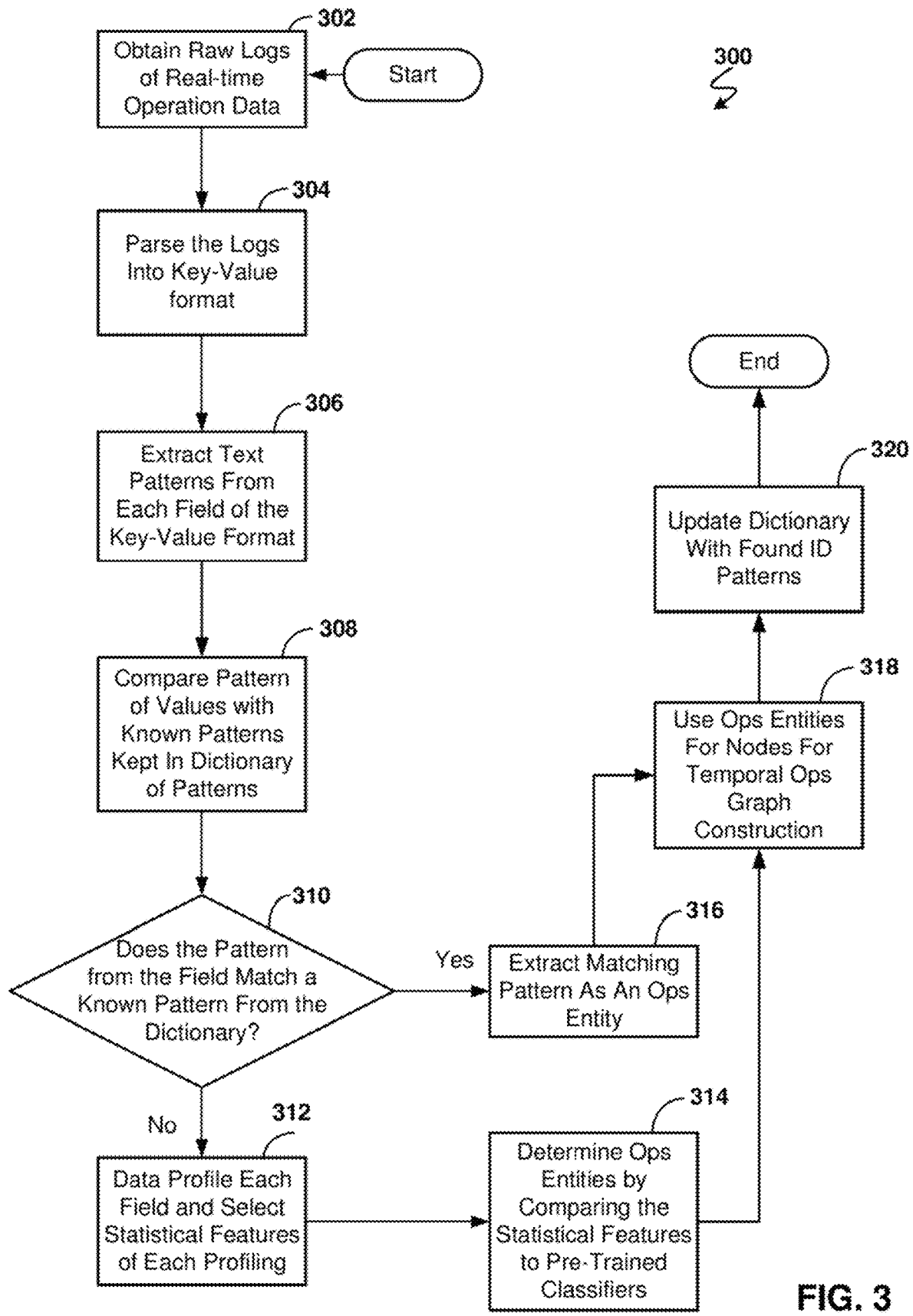
FIG. 3 illustrates an operational flowchart for a process for extracting and using ops entities according to at least one embodiment.

Referring now to FIG. 3, an ops entity/object extraction process 300 is illustrated according to at least one embodiment. The operations entity/object extraction process 300 is used to determine nodes for the generation of the global graph and provides more details for the extraction process performed in step 208 of the dynamic graphing process 200.

In step 302, raw logs of real-time operation data a received. Step 302 is similar to step 202 of the dynamic graphing process 300. In at least one embodiment, the raw logs of real-time operation data from the distributed workload may be JSON files. These JSON files may be transmitted through the communications network 116 and may be received by the server 112. JSON files may be used for transmitting data between a web application and a computer server, e.g., server 112. In other embodiments, other real-time operation data such as XML files, YAML files, TOML files, or CSON files may be received. The raw logs of the real-time operation data may be received, e.g., at the server 112, from other components in a distributed workload of a hybrid cloud system.

In step 304, the logs are parsed into key-value format. FIG. 8 shows an example of raw data that has been pre-processed to obtain a key-value format 800. This raw data which may include raw logs was received from real-time operations of a distributed workload in a hybrid cloud. In this key-value format, a key is in a first column is a key. In a second column to the right of the first column is a value for the key. JSON objects are usually surrounded by curly braces { }. The keys for JSON objects may be strings. Values may include a string, a number, an object, an array, a boolean or a null. Keys and values may be separated by a colon. Each key/value pair may be separated by a comma. Step 304 is similar to the pre-processing of step 204 from dynamic graphing process 200 that was shown in FIG. 2. With the raw logs parsed or modified to be in a key-value format, the dynamic graphing program 110a, 110b may mom easily scan, read, and understand the information in the logs to identify ops entities and ops objects.

In step 306, text patterns are extracted from each field of the key-value format. The dynamic graphing program 110a, 110b may process the text from each field as strings or as sequences of encoded characters. The dynamic graphing program 110a, 110b may break a string into shorter tokens like words and may synthesize tokens into new distributions of words in the form of concordances or visualizations. This extraction may include different logical operations that enrich, split, and recombine the texts for rereading.

In step 306, a pattern of values is compared with known patterns that are kept in a dictionary of patterns that is stored in a memory associated with the dynamic graphing program 110a, 110b, e.g., that may be stored in database 114. This dictionary of patterns may include known ops entities for the distributed workload such as requests, transactions, services, users, tenants, threads, pods, containers, workspaces, clients, hosts, conversations, etc. By keyword searching through the text, values, or patterns from the key-value pain, the dynamic graphing program 110a, 110b may recognize entries of the key-value pairs as referring to ops entities. When the raw lop a provided as text information, then the dynamic graphing program 110a, 110b may use keyword searching. When the raw lop are provided in another format such as an image file, then the dynamic graphing program 110a, 110b may use optical character recognition on the image in order to prepare the raw lop for keyword searching. This comparison of step 306 may include rule-based comparison. The rules for such a rule-based comparison may include references to syntactic, morphological, and lexical patterns and may be related to semantic or phonological aspects.

In step 310, a query is performed as to whether the pattern from the fields of the key-value format match a known pattern from the stored dictionary of patterns. The results of step 306 may generate for step 310 the information needed for the query. In some instances, the dynamic graphing program may generate binary data, e.g., data in the form of a zero or a one, to indicate whether the patterns extracted from the key-value pairs matched any entry from the saved dictionary of patterns. The zero entry may indicate a match, and the one entry may indicate no match. In some instances, the matching may be relative and consistency greater than a threshold is considered to constitute a match. For example, in some instances if a pattern extracted makes an eighty-five percent match with a dictionary entry, then the pattern may be considered to be a match.

If the query of step 310 has an affirmative answer, then step 316 is performed and the matching pattern is extracted as an ops entity. The dynamic graphing program 110a, 110b may extract the matched pattern from the key-value format and may save this entry in another portion of the database 114 in preparation for generation of a global graph. The matched entry may be extracted along with its specific value pair from the corresponding second column. Any specific instances of the ops entity may be designated as respective unique nodes in the global graph that is generated. A unique value from the second column may indicate the presence of a new ops object for which a new node will be needed during global graph generation. Fields representing ops entities may be extracted from the parsed raw data.

If the query of step 310 has a negative answer, then steps 312 and 314 are performed. In step 312, each field is data profiled and statistical features of each profiling are selected. With the data profiling, the data from the key-value pairs is examined and statistics may be collected concerning the data. Informative summaries about that data may be generated. Data profiling may utilize methods of descriptive statistics such as minimum, maximum, mean, mode, percentile, standard deviation, frequency, variation, aggregates such as count and sum, and additional metadata information obtained during data profiling such as data type, length, discrete values, uniqueness, occurrence of null values, typical string patterns, and abstract type recognition to attempt to recognize meaningful information from the key-value pairs. In step 314 ops entities are determined by comparing the statistical features to pre-trained classifiers. The dynamic graphing program 110a, 110b may incorporate a machine learning model with classifiers to help analyze the results of the data profiling. The machine learning model may use the statistical features to suggest new terms or phrases that are identified as referring to a new type of an ops entity.

Steps 308, 310, and 312 may alternatively output context entities for those entries that do not match an entity entry from the saved dictionary or that are not recognized as an entity via data profiling. These entries may help provide context for the ops entities. Such context entities may include timestamps, indexes, messages, elapsed times, types, size requests, time requests, resource classes, etc. Some context entities may also be saved in the database 114 and identified via keyword searching. Key-value entries that do not match an ops entity may be further searched for matching of context entities. The dynamic graphing program 110a, 110b may separate the parsed raw data entries into an ops entity list and a context entity list.

In step 318, the determined ops entities from step 314 and/or from step 316 are used for nodes for the temporal ops graph construction, e.g., for the construction of the global graph, e.g., the first global graph 601. Each specific ops object for the ops entities may be represented as a node in the global graph. Thus, if a particular ops entity has fifteen unique instances, i.e. has fifteen unique ops objects, then the global graph may contain fifteen unique nodes to represent those fifteen unique ops objects. This step 318 may include a processor of the server 112 mapping entries in the ops entity list to the ops objects. e.g., to the unique instances, e.g., in the above example to the fifteen unique instances. Thus, an extracted ops entity mapped to fifteen unique instances may be input for graph generation as fifteen separate nodes for the graph.

In step 320 of the ops entity/object extraction process 300 shown in FIG. 3, the dictionary that was accessed in step 310 and that is stored in a computer memory accessible to the dynamic graphing program 110, 110b is updated with any new ops entity that is discovered via steps 312 and 214. The new ops entity may be stored in a list of the dictionary in the database 114. For subsequent generations of other global graphs using other or additional information, the new entries in the saved dictionary may be used to help find potential nodes from newly received raw operations logs.

Figure 4:
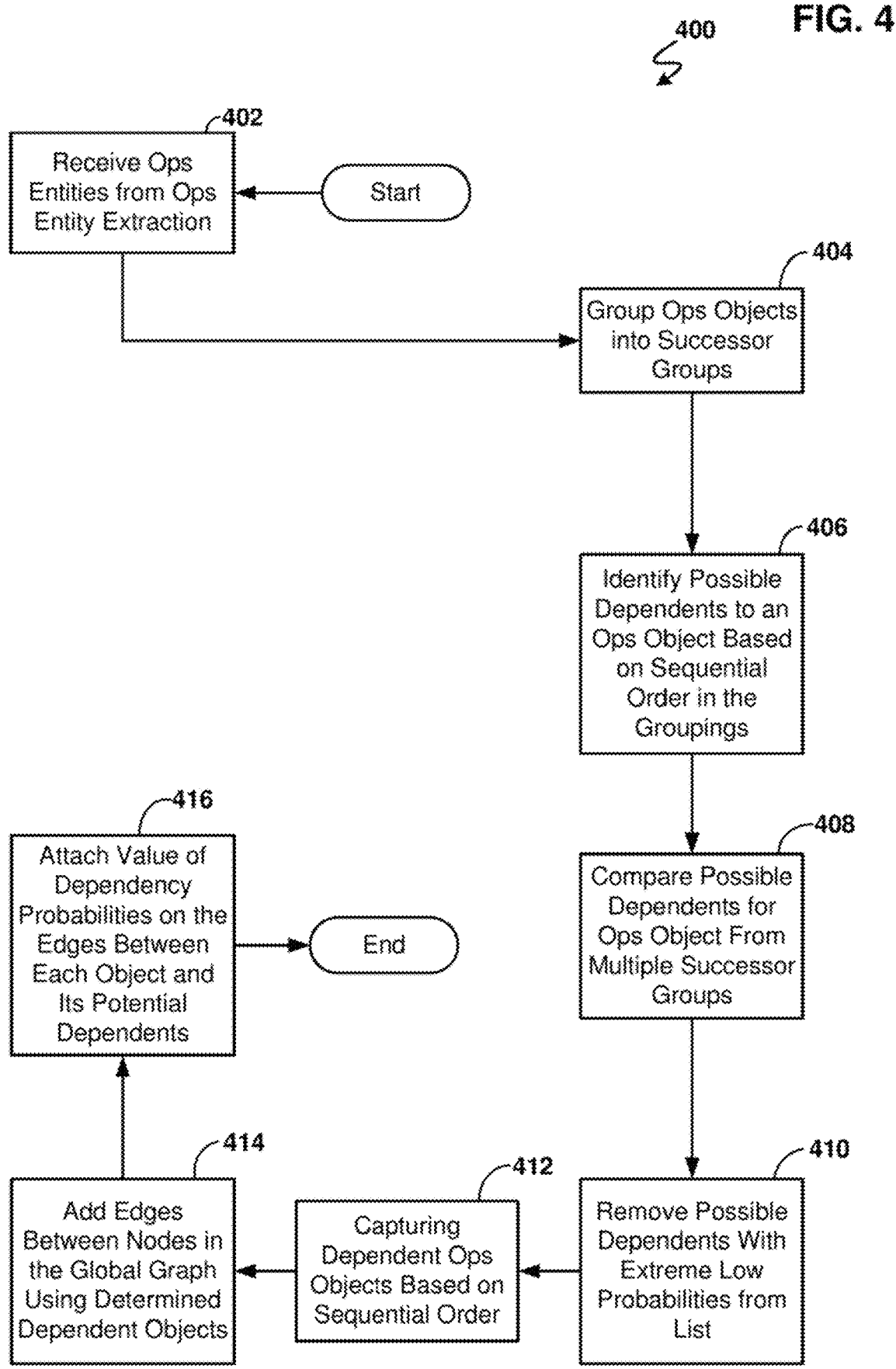
FIG. 4 illustrates an operational flowchart for a process for extracting and using ops objects dependencies according to at least one embodiment.

Referring now to FIG. 4, a dependency extraction process 400 is illustrated according to at least one embodiment. The dependency extraction process 400 is used to determine edges for the generation of the global graph, e.g., of the first global graph 601, and provides more details for the extraction process performed in step 210 of the dynamic graphing process 200.

In step 402 of the dependency extraction process 400 shown in FIG. 4, ops entities from the ops entity/object extraction process 300 a received. These ops entities may be stored in a separate portion of the database 114 of the server 112. The server 112 may pass the ops entities into a buffer queue and may subsequently send them another processor within the server 112 for use in the dependency extraction process 400.

In step 404, ops objects are grouped into successor groups. Within the successor groups, the ops objects may be arranged in a sequential order of their occurrence based on time information provided with the raw data entries that identify these ops objects. This grouping of step 404 may include one or more of identifier-based grouping and workflow-based grouping being performed. This grouping of step 404 may occur based on temporal occurrence of the raw data, e.g., of the raw logs obtained in step 302 (FIG. 3) and/or of the real-time operation data received in step 202 (FIG. 2).

For identifier-based grouping, as part of step 404 the dynamic graphing program 110a, 110b may review each ops entity that was identified in the ops entity/object extraction process 300. For identifier-based grouping, the text of the ops entities may be searched by a string searching module that is part of the server 112 or that is otherwise associated with the dynamic graphing program 110a, 110b. This searching may help identify any ops entities with specific identifiers. Such specific identifiers may include a transaction code, a card ID, a thread ID, etc. The identifier may originate from a system component. An ops object may have a specific identifier, as an ops object is, due to its specific instance, distinguishable from other ops entities of the same entity type. Thus, the ops entity instance itself may in some embodiments act as a specific ID. Knowing the specific ID helps the dynamic graphing program 110a, 110b recognize multiple entries for an ops object throughout the raw data and use these various entries to discover the dependencies of that particular ops object. Specific IDs may be different from generic IDs such as a hostname, an object name, a universally unique identifier (UUID), a component name, etc. The grouping of step 406 may include ordering the operations entities according to timestamps listed for the completion or for the entry of the log corresponding to the particular ops entity. In one embodiment, a group may be created based on the first appearance of a specific ID in a node, with that node then being designated as a start node for a group. An end node for the group may be identified based on when the last time the specific ID appears.

Figure 6C:
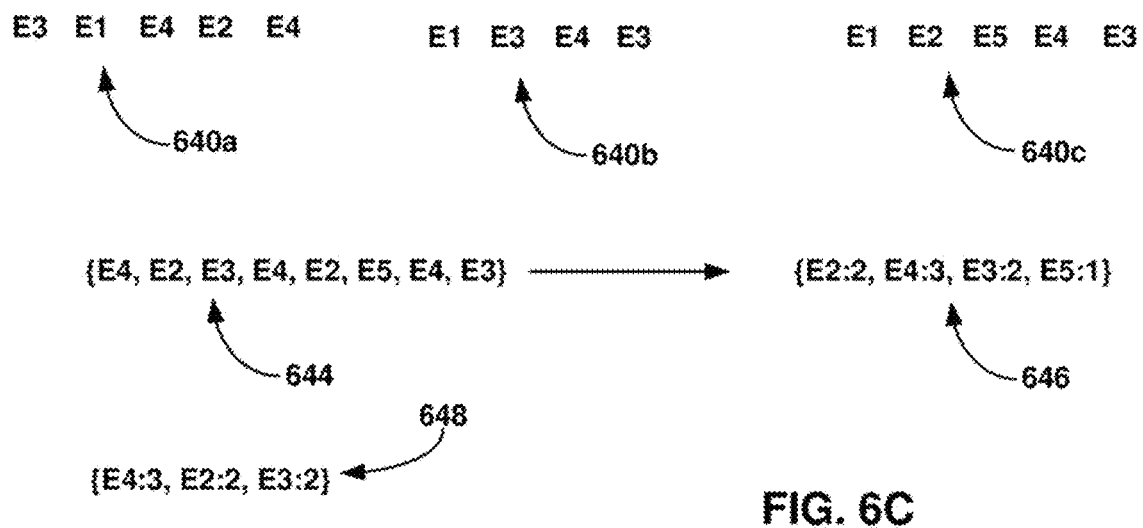
FIG. 6C illustrates aspects of operations objects dependencies abstraction according to at least one embodiment.

For workflow-based grouping, as part of step 404 the dynamic graphing program 110a, 110b may order the ops objects according to timestamps listed for the completion or for the entry of the log corresponding to the particular ops object. Groups may naturally be created where time intervals between adjacently listed operations entities, e.g., steps, are much longer than execution times of each step inside one task. Thus, comparing the times, e.g., the execution times, between each ops object may naturally indicate breaks to be interpreted as breaks between groups. FIG. 6C shows in its upper portion an example of three groupings of objects, namely a first grouping 640a, a second grouping 640b, and a third grouping 640c. These groupings contain various ops objects which are represented, for simplicity, with E1, E2, E3, E4, and E5.

In step 406, possible dependents to an ops object are identified based on sequential order in the groupings. In the example shown in FIG. 6C, the target object E1 is chosen by the dynamic graphing program 110a, 110b as the target object for which possible dependent ops objects will be examined. The sequential order of these entities/objects in the first grouping 640a, the second grouping 640b, and the third grouping 640c are shown running from left to right, with earlier performed ops objects being towards the left.

In the first grouping 640a, ops object E3 is the first ops object to take place. Ops objects E1, E2, and E4 each occur after the ops object E3 in the first grouping 640a, e.g., each took place after the occurrence represented by ops object E3. In the first grouping 640a, ops object E3 occurs before the target object E1 and, therefore, in the first grouping 640a is not a possible dependent to the target object E1. In the first grouping 640a, ops objects E4 and E2 both occur after the target object E1 and, therefore, in the first grouping 640 are possible dependents to the target ops object E1.

In the second grouping 64b, the target object E1 is the first ops object to take place, as is shown by E1 being listed furthest to the left in the group. Ops objects E3 and E4 each occur after the target object E1 in the second grouping 640b, e.g., each represent an occurrence that took place after the occurrence represented by the target object E1. Therefore, in the second grouping 640b ops objects E3 and E4 are possible dependents to the target ops object E1.

In the third grouping 640c, the target object E1 is the first ops object to take place, as shown by E1 being listed furthest to the left in the group. Ops objects E2, E5, E4, and E3 each occur after the target object E1 in the third grouping 640c, e.g., each represent an occurrence that took place after the occurrence represented by the target object E1. Therefore, in the third grouping 640c ops objects E2, E5, E4, and E3 are possible dependents to the target object E1. Although this grouping was discussed in the above paragraphs as relating to ops objects, this grouping may also be performed with respect to the ops entities extracted from the raw data.

The dynamic graphing program 110a. 110b may include a text comparison module to perform the identification of possible dependents in step 406. Such text comparison module may compare text that is provided in each grouping. A processor of the server 112 may in some embodiments perform this identification of step 406.

In step 406, possible dependents for ops objects from multiple successor groups are compared. In the example shown in FIG. 6C, a combined successor group 644 shows a listing of all possible dependents from the various groupings in which the target object E1 is present. For this example, the combined successor group 644 is made up of the possible dependents to the target object E1 from the first grouping 640a, the second grouping 640b, and the third grouping 640c. FIG. 6C also shows a summary set 646 which lists each possible dependent entity/object and the number of instances of their respective possible dependency in which the respective possible dependent actually succeeded the target object E1. Thus, the summary set 646 lists E2:2, E4:3, E3:2, and E5:1 indicating that ops object E2 succeeded target object E1 twice in the various groupings, that ops object E4 succeeded target object E1 three times in the various groupings, that ops object E3 succeeded target object E1 twice in the various groupings, and that ops object E5 succeeded target object E1 once in the various groupings. A processor of the server 112 may in some embodiments perform this comparison of step 406.

In step 410, possible dependents with extremely low probabilities a removed from the list. In the example shown in FIG. 6C, ops object E5 succeeds the target object E1 with substantially lower frequency as compared to the frequencies with which the remaining possible dependents succeed the target object E1. Thus, the ops object E5 may be removed in step 410 from the list of possible dependents as constituting noise. A threshold value may be stored in the database 114 or in another computer memory associated with the dynamic graphing program 10a, 11b that be used by the dynamic graphing program 110a, 11b to determine a possible dependent with an extremely low succession probability that would be suitable for removal from the successor group. A processor of the server 112 may perform the removal of step 410.

In step 412, dependent ops objects are captured based on the sequential order. In the example shown in FIG. 6C, the ops objects represented by E4, E2, and E3 may be captured as being dependent on the target object E1. FIG. 6C shows a captured dependent group 648 which includes the ops objects E4, E2, and E3 as the objects that are or may be dependent on the target object E1. A processor of the server 112 may perform the capturing of step 412.

In step 414, edges are added between the nodes in the global graph using the determined dependent ops objects. Thus, in a global graph or in a sub-graph that is generated by the dynamic graphing program 110a, 110b a first edge may run from a node representing the target object E1 to a node representing the ops object E4, a second edge may run from the node representing the target object E1 to anode representing the ops object E2, and a third edge may run from a node representing the target object E1 to a node representing the ops object E3. A processor of the server 112 may in some embodiments perform the edge addition of step 414.

In step 416 of the dependency extraction process 400 shown in FIG. 4, a value of dependency probabilities is attached on the edge between each node (representing an ops object) and potential dependents of the respective node. FIG. 7C shows an example of a pop-up graphic, namely second pop-up graphic 716b that may be generated and presented or displayed to a user when the user scrolls a cursor, e.g., the second cursor 718b, over a particular edge in a global graph or in a sub-graph, in this instance over the third direct edge 712c. This second pop-up graphic 716b shows that the dependency between the second service node 7086b and the second tenant node 706b was calculated by the dynamic graphing program 110a, 110b to be 90.88%. Thus, the dependency between the objects represented by the second service node 7086b and the second tenant node 706b is not determined as one hundred percent verified but is highly likely based on the calculation and analysis performed by the dynamic graphing program 110a, 110b. This attachment of step 416 may then be included as part of the presentation of a global graph or of a sub-graph, e.g., that is performed in step 228 of the dynamic graphing process 200. A processor of the server 112 may perform the dependency probability attachment of step 416.

Figure 5:
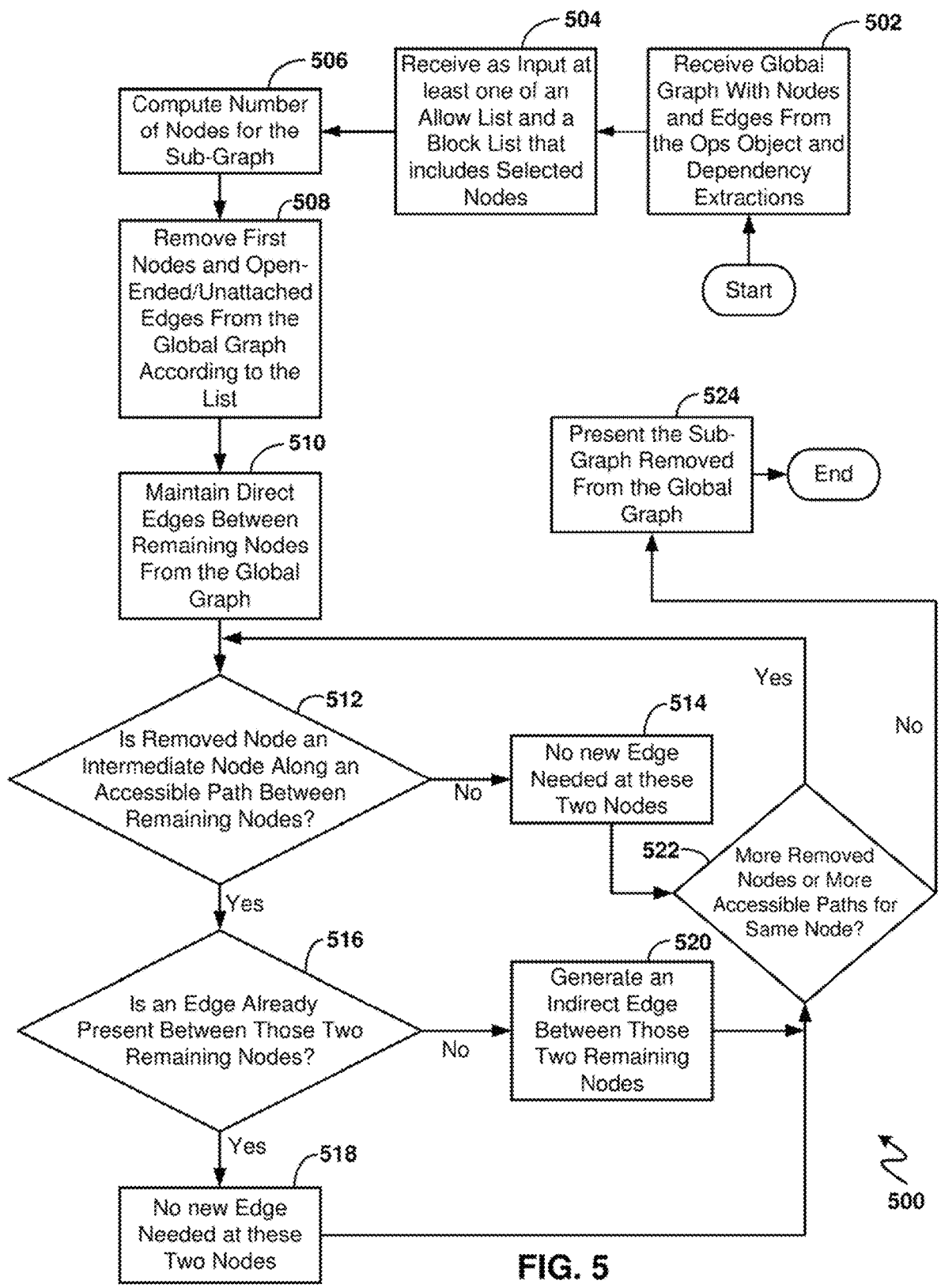
FIG. 5 illustrates an operational flowchart for a process for abstracting a sub-graph from a global graph according to at least one embodiment.

Referring now to FIG. 5, a sub-graph abstraction process 500 is illustrated according to at least one embodiment. The sub-graph abstraction process 500 is used to generate a sub-graph to allow its presentation separate from a global graph. Thus, the sub-graph extraction process 500 provides more detail or alternative embodiments for the steps 216 to 228 that ae part of the dynamic graphing process 200 that is shown in FIG. 2.

In step 502 of the sub-graph abstraction process 500 shown in FIG. 5, a global graph with nodes and edges from the ops object and dependency extractions is received. FIG. 6A shows an example of a first global graph 601 that in one embodiment may be received as part of step 502. FIG. 6A shows that the user interface that is presented includes a first node legend 604a. The first node legend 604a in this embodiment indicates that fifteen different entity types are displayed in the first global graph 601. The fifteen different entity types include threads, pods, container IDs, operations nodes, containers, transaction IDs, tenant IDs, workspace IDs, conversation IDs, event service IDs, workspace IDs, transaction IDs, request IDs, global transaction IDs, and clients. These different entity types are shown in the first global graph 601 with different shadings. Each circle or node in the graph for each entity type represents a specific operations object of that operations entity. For example, one circle shown in the first global graph 601 that has a shading that matches the "pods" shading in the first node legend 604a may be an ops object named OverflowAccount pod. Other circles shown in the first global graph 601 that have a shading that matches the "pods" shading in the first node legend 604a may be ops objects with different names than OverflowAccount pod. Edges between the depicted nodes may also be seen in the first global graph 601. The global graph, e.g., the first global graph 601, that is received in step 502 may be generated by a processor of the server 112 under direction of the dynamic graphing program 11b. The first global graph 601 may be passed from a first processor in the server 112 to and received by a second processor in the server 112. In some embodiments, the global graph that is generated will be displayed on a display monitor of a computer, e.g., on the computer display monitor 924 of the computer 102. In other embodiments, the global graph that is generated is partially displayed or is not displayed on the graph. The first global graph 601 depicts interactions among ops objects of a distributed workload, e.g., of a cloud native system, using nodes and edges. The ops objects are instances of the fifteen entity types that were used as inputs for the generation of this global graph.

In step 504, at least one of an allow list and a block list that includes selected nodes is received as input. In the embodiment shown in FIG. 6B, a user may interact with a first allow list 608 and a first block list 610 to select which entity types to include for a sub-graph to be generated and which entity types to exclude for a sub-graph to be generated. In some embodiments, the possible entity types to select include only entity types that are present in a selected distributed workload and in a global graph that was generated. In the example distributed workload depicted via the first global graph 601 in FIG. 6A, fifteen different types of entities are depicted and included in the distributed workload information. In the embodiment shown in FIG. 6B, a user has controlled the first allow list 606 and the first block list 610 to select four entity types—namely, threads, pods, container IDs, and operation nodes, to include in the first sub-graph 602. Other entity types such as transaction IDs, tenant IDs, workspace IDs, thread names, instance IDs, conversation IDs, event service IDs, workspace IDs, service IDs, and transaction IDs have been placed in the first block list 610. When a user actuates a sub-graph abstraction graphical button 612, then the dynamic graphing program 110a, 110b generates the first sub-graph 602 using the processes described in FIGS. 2-5. The second node legend 604b shown in FIG. 6B indicates that the four selected entity types—namely, threads, pods, container IDs, and operation nodes, have been included in the first sub-graph 602. These four different types of operations entities are depicted in the first sub-graph 602 all as circles or nodes but with different shaded colors. The user interface depicted in FIG. 6B includes a distributed workload control button 606 via which a user may select various distributed workloads to use as input to generate a global graph and eventually a sub-graph for presentation and display on a computer screen. The first sub-graph 602 depicts interactions among ops objects of a distributed workload using nodes and edges. The ops objects of this first sub-graph 602 are instances of the four entity types that were selected based on the input of the list. e.g., of the allow list and/or of the block list.

In the embodiments shown in FIGS. 7A, 7B, and 7C, a first small global graph 700 shown in FIG. 7A is used as a basis for generating a first small sub-graph 720 shown in FIG. 7B and is used as a basis for generating a second small sub-graph 722 shown in FIG. 7C. The first small global graph 700 depicts interactions among ops objects of a distributed workload using nodes and edges. The ops objects are instances of five selected entity types input for generation of this global graph.

The first small global graph 700 shown in FIG. 7A is smaller than a typical global graph but is used for simplicity and illustrative purposes. The first small global graph 700 includes triangles to represent ops entities that are requests. FIG. 7A shows a first request node 702a, a second request node 702b, and a third request node 702c. The first small global graph 700 includes circles to represent ops entities that are users. FIG. 7A shows a first user node 704a and a second user node 704b. The first small global graph 700 includes pentagons to represent ops entities that are tenants. FIG. 7A shows a first tenant node 706a and a second tenant node 706b. The first small global graph 700 includes squares to represent ops entities that are services. FIG. 7A shows a first service node 708a and a second service node 7086b. The first small global graph 700 includes a hexagon to represent an ops entity that is a transaction. FIG. 7A shows a first transaction node 710a.

To generate the first small sub-graph 720 that is shown in FIG. 7B starting from the first small global graph 700 shown in FIG. 7A, an allow list is input that includes the requests and the services as the ops entities to include. In the embodiment shown in FIG. 7B, no block list is input to generate the first small sub-graph 720. Thus, for the embodiment of FIG. 7A the nodes on the list, e.g., the selected nodes on the allow list, are included in the first small sub-graph 720 as remaining nodes. The first small sub-graph 720 that is shown in FIG. 7B may alternatively be generated starting from the first small global graph 700 by the inputting of a block list that includes transactions, users, and tenants as entities to be blocked.

In some embodiments, the dynamic graphing program 110a, 110b may use a default program setting that any entity present in the global graph that is not included in either an allow list or a block list when both an allow list and a block list are input will be considered as being part of the allow list. In some embodiments, the dynamic graphing program 110a, 110b may use a default program setting that any entity present in the global graph that is not included in either an allow list or a block list when both an allow list and a block list are input will be considered as being part of the block list. In some embodiments, the dynamic graphing program 110a, 110b will force all entities to be in either a block list or in an allow list. For these embodiments a main list will include both the block list and the allow list and when entities are present in both the block list and the allow list then the inclusion of both the allow list and the block list may be mandatory. For these embodiments with both lists, entities on the allow list may be referred to as to-be-allowed nodes, and entities on the block list may be referred to as to-be-blocked nodes.

To generate the second small sub-graph 722 that is shown in FIG. 7C starting from the first small global graph 700 shown in FIG. 7A, a block list is input that includes the request nodes. In the embodiment shown in FIG. 7C, no allow list is input to generate the second small sub-graph 722. Thus, for the embodiment of FIG. 7C the nodes on the list, e.g., the selected nodes on the block list, are the nodes that are to be removed from the global graph, e.g., from the first small global graph 700, for the generation of the second small sub-graph 722. The second small sub-graph 722 that is shown in FIG. 7C may alternatively be generated from the first small global graph 700 shown in FIG. 7A by the inputting of an allow list that includes the transaction entities, the services entities, the users entities, and the tenants entities.

In step 506 of the sub-graph abstraction process 500 shown in FIG. 5, a number of nodes for the sub-graph is computed. The dynamic graphing program 110a, 110b may use the input from step 504 to compute the number of the nodes for the sub-graph. With that input, the dynamic graphing program 110a, 110b knows which entity types are to be included in the sub-graph to be generated and which entity types are not to be included in the sub-graph and can use a processor, e.g., a processor of the server 112, to count the number of nodes from the global graph that are to be included in the sub-graph. For the sub-graph abstraction shown between FIGS. 7A and 7B, the dynamic graphing program 110a, 110b may calculate after the inputting of the allow list that five nodes will be present in the sub-graph to be generated, in this instance in the first small sub-graph 720. For the sub-graph abstraction shown between FIGS. 7A and 7C, the dynamic graphing program 110a, 110b may calculate after the inputting of the block list that seven nodes will be present in the sub-graph to be generated, in this instance in the second small sub-graph 722.

In step 508 of the sub-graph abstraction process 500 shown in FIG. 5, first nodes and open-ended/unattached edges are removed from the global graph according to the list. For example, in the abstraction embodiment shown between FIGS. 6A and 6B all of the nodes for the containers, transaction ID, tenant ID, workspace IDs, conversation IDs, event service IDs, workspace IDs, transaction IDs, request IDs, global transaction IDs, and clients are to be deleted from the first global graph 601 shown in FIG. 6A for the abstraction and generation of the first sub-graph 602 that is shown in FIG. 6B. In the sub-graph abstraction embodiment shown between FIGS. 7A and 7B, all of the transaction nodes (hexagons), the user nodes (circles), and the tenant nodes (pentagons) are deleted as a part of step 508. Some edges that were also connected to the transaction nodes (hexagons), the user nodes (circles), and the tenant nodes (pentagons) in FIG. 7A may be deleted for step 508 for the abstraction of the first small sub-graph 720. In the sub-graph abstraction embodiment shown between FIGS. 7A and 7C, all of the request nodes (triangles) are deleted as a part of step 508. Some edges that were also connected to the request nodes (triangles) may be deleted for step 508 for the abstraction of the second small sub-graph 722.

In step 510 of the sub-graph abstraction process 500 shown in FIG. 5, direct edges between remaining nodes from the global graph are maintained. For example, in the embodiment shown in FIGS. 6A and 6B all of the direct edges between the nodes for the threads, pods, container IDs, and operation nodes are to be maintained from the first global graph 601 shown in FIG. 6A for the abstraction of the first sub-graph 602 that is shown in FIG. 6B. In the sub-graph abstraction embodiment shown between FIGS. 7A and 7B, all of the direct edges between the request nodes (triangles) and the service nodes (squares) are maintained as a part of step 510. In this example, three direct edges are maintained. Specifically, a second direct edge 712*b* between the first service node 708*a* and the second request node 702*b* that depends on the first service node 708*a* is maintained. Another direct edge between the second service node 706*b* and the second request node 702*b* that depends on the second service node 706*b* is maintained. Another direct edge between the first service node 706*a* and the second service node 706*b* that depends on the first service node 706*a* is maintained. In the sub-graph abstraction embodiment shown between FIGS. 7A and 7C, all of the direct edges between all of the nodes besides the request nodes (triangles) are maintained as a part of step 510. In this example, six direct edges ae maintained. Specifically, a direct edge between the first user node 704*a* and the first tenant node 706*a* that depends on the first user node 704*a* is maintained. Another direct edge between the first service node 706*a* and the first transaction node 710*a* that depends on the first service node 706*a* is maintained. Another direct edge between the first service node 706*a* and the second service node 706*b* that depends on the first service node 706*a* is maintained. Another direct edge between the second service node 706*b* and the first transaction node 710*a* that depends on the second service node 706*b* is maintained. A third direct edge 712*c* between the second service node 706*b* and the second tenant node 706*b* that depends on the second service node 706*b* is maintained. Another direct edge between the second user node 704*b* and the first tenant node 706*b* that depends on the second user node 704*b* is maintained.

In step 512 of the sub-graph abstraction process 500 shown in FIG. 5, a query is performed as to whether the removed node is an intermediate node along an accessible path between remaining nodes. An accessible path along the sub-graph between remaining nodes may exclude a circular path that begins and ends with a particular node and with no remaining node lying along that circular path. In an alternative embodiment, a query may be performed in addition or in alternative to the query of step 512 as to whether the removal of a first node disrupted any accessible path of the global graph with respect to the remaining nodes that are to remain for the abstracted sub-graph. In this alternative embodiment, a subsequently generated indirect edge may, in response, reestablish the accessible path that was disrupted.

For example with respect to step 512, for the embodiment of FIGS. 7A and 7B the first tenant node 706*a*, which is a removed node because tenants were not on the allow list, is checked as to whether the first tenant node 706*a* lies along an accessible path of any of the remaining nodes which in the case of FIG. 7B will be the request nodes (triangles) and the service nodes (squares). The first tenant node 706*a* is not along an accessible path between any of the remaining nodes. In the first small global graph 700 an accessible path existed running from the second request node 702*b* to the first user node 704*a* then to the first tenant node 706*a* and then back to the first request node 702*b*. However, since both the first user node 704*a* and the first tenant node 706*a* are to be removed in step 508, this accessible path for the first small sub-graph 720 becomes a circular path starting and ending with the second request node 702*b*. Thus, the query of step 512 is a negative for the first tenant node 706*a* for the sub-graph abstraction of FIGS. 7A and 7B. The first tenant node 706*a* did not lie in any other accessible path within the first small global graph 700.

For the sub-graph abstraction embodiment of FIGS. 7A and 7B, as a part of step 512 the first transaction node 710*a*, which is anode to be removed because the transactions were not on the allow list, is checked as to whether the first transaction node 710*a* lies along an accessible path of any of the remaining nodes which in the case of FIG. 7B will be the request nodes (triangles) and the service nodes (squares). The first transaction node 710*a* lies along an accessible path between the first service node 708*a* and the third request node 702*c*. The first transaction node 710*a* also lies along an accessible path between the second service node 70*b* and the third request node 702*c*. Thus, the query of step 512 is an affirmative for the first transaction node 710*a* for the sub-graph abstraction of FIGS. 7A and 7B.

For the sub-graph abstraction embodiment of FIGS. 7A and 7C, as part of step 512 the second request node 702*b*, which is a node to be removed because requests were on the block list, is checked as to whether the second request node 702*b* lies along an accessible path of any of the remaining nodes which in the case of FIG. 7C will be the other nodes from the first small global graph 700 from FIG. 7A except for the request nodes (triangles). This checking that may be performed by a processor of the server 112 may reveal that the second request node 702*b* lies along an accessible path between the first user node 704*a* and the first tenant node 706*a*. This particular accessible path includes the upwardly-slightly right dependency extending from the first tenant node 706*a* to the second request node 702*b*, and then a slightly upwardly-leftwards dependency extending from the second request node 702*b* to the first user node 704*a*. Thus, the query of step 512 is an affirmative for the first transaction node 710*a* for the sub-graph abstraction of FIGS. 7A and 7C.

Similar analysis may be performed for other accessible paths and for other removed nodes for the FIGS. 7A-7B embodiment (removed nodes—first user node 704*a*, second user node 704*b*, and the second transaction node 706*b*) and for other possible accessible paths and for other removed nodes for the FIGS. 7A-7C embodiment (removed nodes—first request node 702*a* and third request node 702*c*).

If the query of step 512 results in a negative determination, then step 514 may be performed which includes a system recognition that no new edge is needed between these two nodes. Thus, for the analysis regarding the first tenant node 706*a*, the sub-graph abstraction process 500 may proceed to step 514 and the dynamic graphing program 110*a*, 110*b* may there recognize that no new edge is needed that would contact or run through the former position in the graph that was held by the first tenant node 706*a*.

If the query of step 512 results in an affirmative determination, then in response step 516 may be performed which is another query as to whether an edge is already present between those two remaining nodes. Thus, for the analysis regarding the first transaction node 710*a* to be removed for the FIGS. 7A-7B sub-graph abstraction, the sub-graph abstraction process 500 may proceed to step 516 and the dynamic graphing program 110a, 110b may there determine or check whether an edge is already present between the first service node 708a and the third request node 702c. Also, a determination or check is performed whether an edge is already present between the second service node 7086b and the third request node 702c. For both of these checks or determinations, the query of step 512 results in a negative for the analysis regarding first transaction node 710a that is removed for this sub-graph abstraction.

For the analysis regarding the second request node 702b to be removed for the FIGS. 7A-7C sub-graph abstraction, the sub-graph abstraction process 500 may proceed to step 516 for the second query. The dynamic graphing program 110a, 110b may at this step 516 determine or check whether an edge is already present between the other nodes along the accessible path identified in step 512, namely if an edge is already present between the first tenant node 706a and the first user node 704a. This checking indicates that the ninth direct edge 712i is already present between the first tenant node 706a and the first user node 704a (with the arrow of the direct edge extending downwards from the first user node 704a to the first tenant node 706a indicating a dependency of the first tenant node 706a on the first user node 704a). Thus, the query of step 516 results in an affirmative for the analysis regarding the second request node 702b that is removed for this sub-graph abstraction.

If the query of step 516 results in an affirmative determination, then step 518 may be performed which includes a system or program recognition that no new edge is needed between these two nodes that would run through the area that was vacated by the removed node. Thus, for the analysis regarding the second request node 702b to be removed for the FIGS. 7A-7C sub-graph abstraction and the previously thereby-connected first tenant node 706a and first user node 704a, the dynamic graphing program 110a, 110b may in step 518 recognize that no new edge is needed that needs to be generated for running through the vacated space of the second request node 702b and from the first tenant node 706a to the first user node 704a.

If the query of step 516 results in a negative determination, then step 520 may be performed by generating an indirect edge between those two remaining nodes. Step 520 overlaps with step 224 of the dynamic graphing process 200. For example for the FIGS. 7A-7B abstraction, where the query of step 516 was negative for two accessible paths running through the first transaction node 710a that is to be removed, then step 520 is performed to generate indirect edges for both paths. A first indirect edge 714a is generated that runs from the first service node 708a to the third request node 702c. A second indirect edge 714b is generated that runs from the second service node 7086b to the third request node 702c. Both the first indirect edge 714a and the second indirect edge 714b run through the area that was vacated by the removal of the first transaction node 710a. Both the second indirect edge 714b and the first indirect edge 714a are depicted with dotted lines so that they have a representation form that is different from the representation form of the direct edges. Similar indirect edge generation may be performed for the abstraction embodiment shown from the combination of FIG. 7A and FIG. 7C, including for the generation of the third indirect edge 714c.

After the performance of step 514, of step 518, or of step 520, then in step 522 another query is performed as to whether more removed nodes need to be analyzed. This step 522 checks for the need to generate any mom indirect edges. Step 522 also may check whether the removed node being analyzed is/was a part of more accessible paths from the global graph. If the query of step 522 results in an affirmative, then step 512 may be repeated for another node or for another accessible path for the same node. If the query of step 522 results in a negative, then step 524 may be performed for the presentation of the sub-graph removed from the global graph.

Step 524 of the sub-graph abstraction process 500 shown in FIG. 5 is equivalent or mostly equivalent to step 228 of the dynamic graphing process 200 shown in FIG. 2. For step 524, the sub-graph, e.g., the first small sub-graph 720 from FIG. 7B or the second small sub-graph 722 from FIG. 7C, is presented removed from the global graph. The sub-graph may be presented on a display of a computer, e.g., on a display or screen of the computer 102, e.g., on the computer display monitor 924 that is shown in FIG. 9. The first sub-graph 602 shown in FIG. 6B depicts interactions among the ops objects which are instances of the four selected ops entities. The first small sub-graph 720 shown in FIG. 7B depicts interactions among the ops objects which are specific instances of the selected request entities and service entities. The second small sub-graph 722 shown in FIG. 7C depicts interactions among the ops objects which are specific instances of the selected transaction entities, service entities, user entities, and tenant entities.

From the example provided above in the combination of FIGS. 7A and 7B for the abstraction of the first small sub-graph 720, the first service node 708a in the first small global graph 700 may be referred to as a first global graph node. The first interaction node 710a in the first small global graph 700 may be referred to as a second global graph node. The third request node 702c may be referred to as a third global graph node. The fourth direct edge 712d from the first small global graph 700 may be referred to as a first global graph direct edge between the first global graph node and the second global graph node and that connects the first global graph node to the second global graph node. The fifth direct edge 712e from the first small global graph 700 may be referred to as a second global graph direct edge between the second global graph node and the third global graph node and that connects the second global graph node to the third global graph node. The first global graph direct edge and the second global graph direct edge are each directed in a first path direction. These elements described (three nodes and two direct edges) together form an accessible path, because the first global graph direct edge and the second global graph direct edge each run or extend in combinable and not inconsistent directions. For the abstraction of the first small sub-graph 720 shown in FIG. 7B, the second global graph node, in this example the first transaction node 710a, is removed as one of the removed rust nodes. The first global graph direct edge, e.g., the fourth direct edge 712d, and the second global graph direct edge, e.g., the fifth direct edge 712e, are each removed for the generation of the first small sub-graph 720. After the removing of the first nodes, the first global graph node, e.g., the first service node 708a, and the third global graph node, e.g., the third request node 702c, are first and second remaining nodes, respectively, of the remaining nodes for the first small sub-graph 720. For the rust small sub-graph 720, the first indirect edge 714a runs between the first remaining node. e.g., the first service node 708a, and the second remaining node, e.g., the third request node 702c. The first indirect edge 714a may connect the first service node 708a to the third request node 702c.

In contrast to the above described accessible path, the combination of graph elements running from the rust service node 708a along the fourth direct edge 712d to the rust transaction node 710a and then along the sixth direct edge 712*f* to the second service node 7086*b* does not form an accessible path. This path does not constitute an accessible path because the direction of the fourth direct edge 712*d* received by the first transaction node 710*a* opposes the direction of the sixth direct edge 712*f* that is also received by the first transaction node.

Figure 7D:
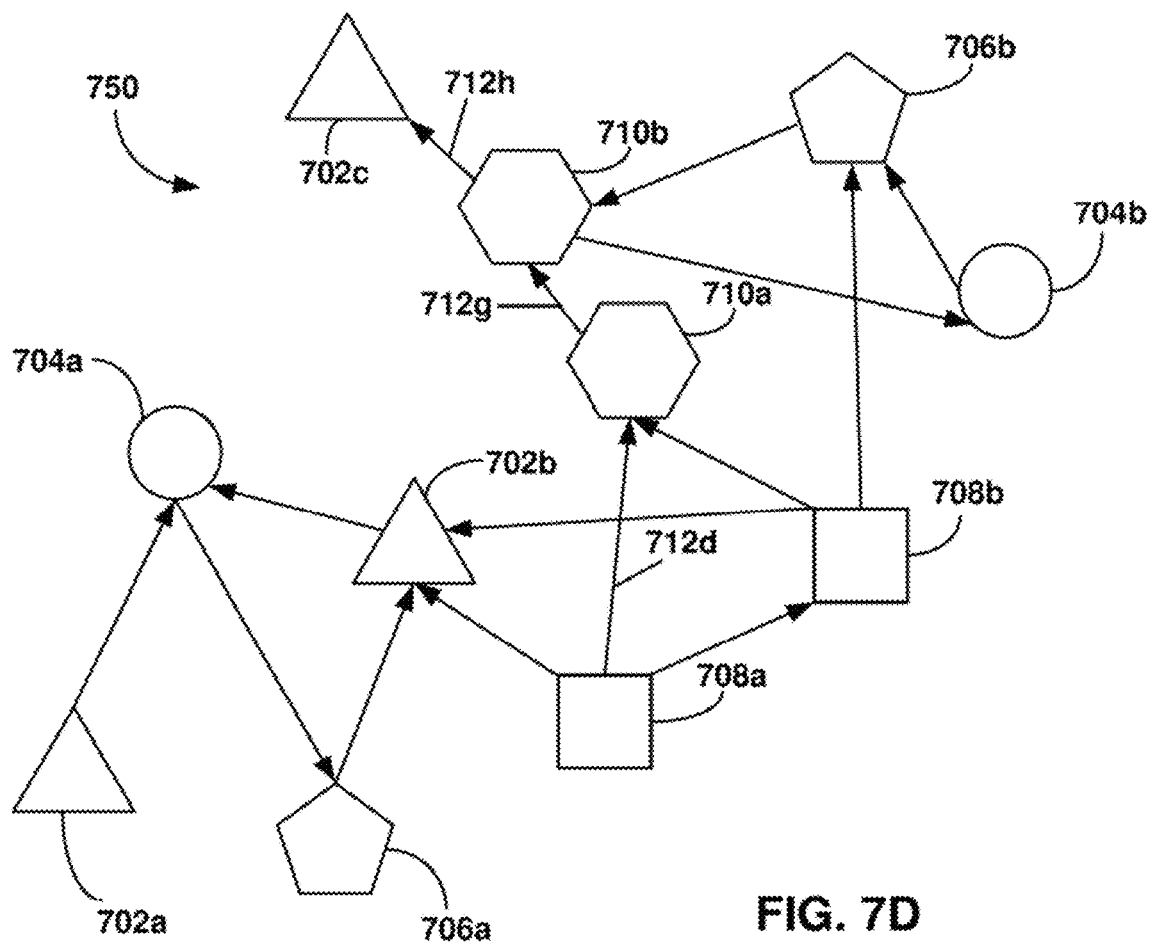
FIG. 7D illustrates another small global graph according to at least one embodiment.
Figure 7E:
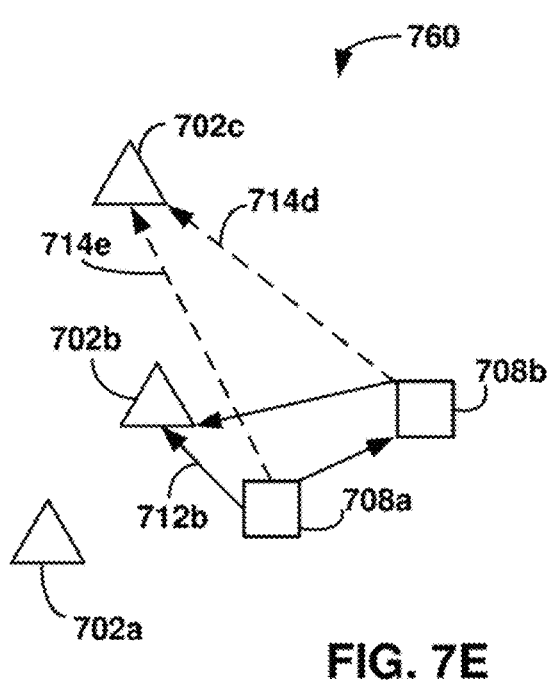
FIG. 7E illustrates a sub-graph which has been abstracted from the global graph of FIG. 7D according to at least one embodiment.

FIG. 7D shows a second small global graph 750 that is similar to the first small global graph 700 but has a second transaction node 710*b* in addition to the rust transaction node 710*a*. In this second small global graph 750 as compared to the rust small global graph 700, the second transaction node 710*b* took the position of the third request node 702*c* but still has a direct connection via a direct edge to the third request node 702*c* that is displaced (as compared to FIG. 7A). FIG. 7E shows a third small sub-graph 760 that is similar to the first small sub-graph 720 that is shown in FIG. 7B. The third small sub-graph 760 is generated by using the second small global graph 750 and by using an allow list which selects request nodes and service nodes only to be in the third small sub-graph 760. FIG. 7E shows that using the dynamic graphing process 200 a fourth indirect edge 714*d* may be inserted to replace two removed nodes, in this case the first transaction node 710*a* and the second transaction node 710*b*, along an accessible path. A fifth indirect edge 714*e* may be inserted to replace two removed nodes, in this case the first transaction node 710*a* and the second transaction node 710*b*, along a different accessible path.

From the examples provided above in the combination of FIGS. 7D and 7E for the abstraction of the third small sub-graph 760, the first service node 708*a* in the second small global graph 750 may be referred to as a first global graph node. The first interaction node 710*a* in the second small global graph 750 may be referred to as a second global graph node. The second transaction node 710*b* may be referred to as a third global graph node. The third request node 702*c* may be referred to as a fourth global graph node. The fourth direct edge 712*d* from the second small global graph 750 may be referred to as a first global graph direct edge between the first global graph node and the second global graph node and that connects the first global graph node to the second global graph node. The seventh direct edge 712*g* from the second small global graph 750 may be referred to as a second global graph direct edge between the second global graph node and the third global graph node and that connects the second global graph node to the third global graph node. The eighth direct edge 712*h* from the second small global graph 750 may be referred to as a third global graph direct edge between the third global graph node and the fourth global graph node and that connects the third global graph node to the fourth global graph node. The first global graph direct edge, the second global graph direct edge, and the third global graph direct edge are each directed in a first path direction. These elements described (four nodes and three direct edges) together form an accessible path, because the first global graph direct edge, the second global graph direct edge, and the third global graph direct edge each run or extend in combinable and consistent or not inconsistent directions. For the abstraction of the third small sub-graph 760 shown in FIG. 7E, the second global graph node and the third global graph node, in this example the first transaction node 710*a* and the second transaction node 710*b*, are removed as two of the removed first nodes. The first global graph direct edge. e.g., the fourth direct edge 712*d*, the second global graph direct edge, e.g., the seventh direct edge 712*g*, and the third global graph direct edge, e.g., the eighth direct edge 712*h*, are each removed for the generation of the third small sub-graph 760. After the removing of the first nodes, the first global graph node, e.g., the first service node 708*a*, and the fourth global graph node, e.g., the third request node 702*c*, are first and second remaining nodes, respectively, of the remaining nodes for the third small sub-graph 760. For the third small sub-graph 760, the fifth indirect edge 714*c* runs between the first remaining node. e.g., the first service node 708*a*, and the second remaining node, e.g., the third request node 702*c*. The fifth indirect edge 714*e* may connect the first service node 708*a* to the third request node 702*c*.

In some embodiments, a global graph and sub-graph generated with the dynamic graphing program 110, 110*b* may depict correlations of a distributed workload for IBM® Watson Assistant. (IBM and all IBM-based trademarks and logos are trademarks or registered trademarks of International Business Machines Corporation and/or its affiliates). In some embodiments, the sub-graph that is generated with the dynamic graphing program 110*a*, 110*b* may be used to focus on a service topology for a distributed workload. In some embodiments, the dynamic graphing process 200 may be used to help show deployment of a distributed workload infrastructure in a cloud environment. In some embodiments, the dynamic graphing process 200 may be used for business and application interactions and may include ops entities such as bookings IDs, bookings flight IDs, usernames, databases, and content. In some embodiments, the dynamic graphing process 200 may be used to show particular relationships or correlations between requests, services, and databases for applications and IT interactions. In some embodiments, the dynamic graphing process 200 may be used to show particular relationships or correlations for dynamic aspects of a mainframe and not only for an open platform.

It may be appreciated that FIGS. 2-5, 6A-6C, 7A-7C, and 8 provide only illustrations of some embodiments and do not imply any limitation with regard to how different embodiments may be implemented. Many modifications to the depicted embodiments may be made based on design and implementation requirements.

FIG. 9 is a block diagram 900 of internal and external components of computers depicted in FIG. 1 in accordance with an illustrative embodiment of the present invention. It should be appreciated that FIG. 9 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902*a*, 902*b* and external components 904*a*, 904*b* illustrated in FIG. 9. Each of the sets of internal components 902*a*, 902*b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the dynamic graphing program 110a in client computer 102, and the dynamic graphing program 110b in network server 112, may be stored on one or more computer-readable tangible storage devices 916 for execution by one or more processors 906 via one or mom RAMs 908 (which typically include cache memory). In the embodiment illustrated in FIG. 9, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, 902b also includes a R/W drive or interface 918 to read from and write to one or mom portable computer-readable tangible storage devices 920 such as a CD-ROM, DVD, memory stick, magnetic tape, magnetic disk, optical disk or semiconductor storage device. A software program, such as the software program 108 and the dynamic graphing program 110a, 110 can be stored on one or more of the respective portable computer-readable tangible storage devices 920, read via the respective R/W drive or interface 918 and loaded into the respective hard drive 916.

Each set of internal components 902a, 902b may also include network adapters (or switch port cards) or interfaces 922 such as a TCP/IP adapter cards, wireless wi-fi interface cards, or 3G or 4G wireless interface cards or other wired or wireless communication links. The software program 108 and the dynamic graphing program 110a in client computer 102 and the dynamic graphing program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the dynamic graphing program 110a in client computer 102 and the dynamic graphing program 110b in network server computer 112 are loaded into the respective hard drive 916. The network may include copper wires, optical fibers, wireless transmission, routers, firewalls, switches, gateway computers and/or edge servers.

Each of the sets of external components 904a, 904b can include a computer display monitor 924, a keyboard 926, and a computer mouse 928. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming larnguages. The computer readable program instructions may execute entirely on the use's computer, partly on the use's computer, as a stand-alone software package, partly on the use's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications crated using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
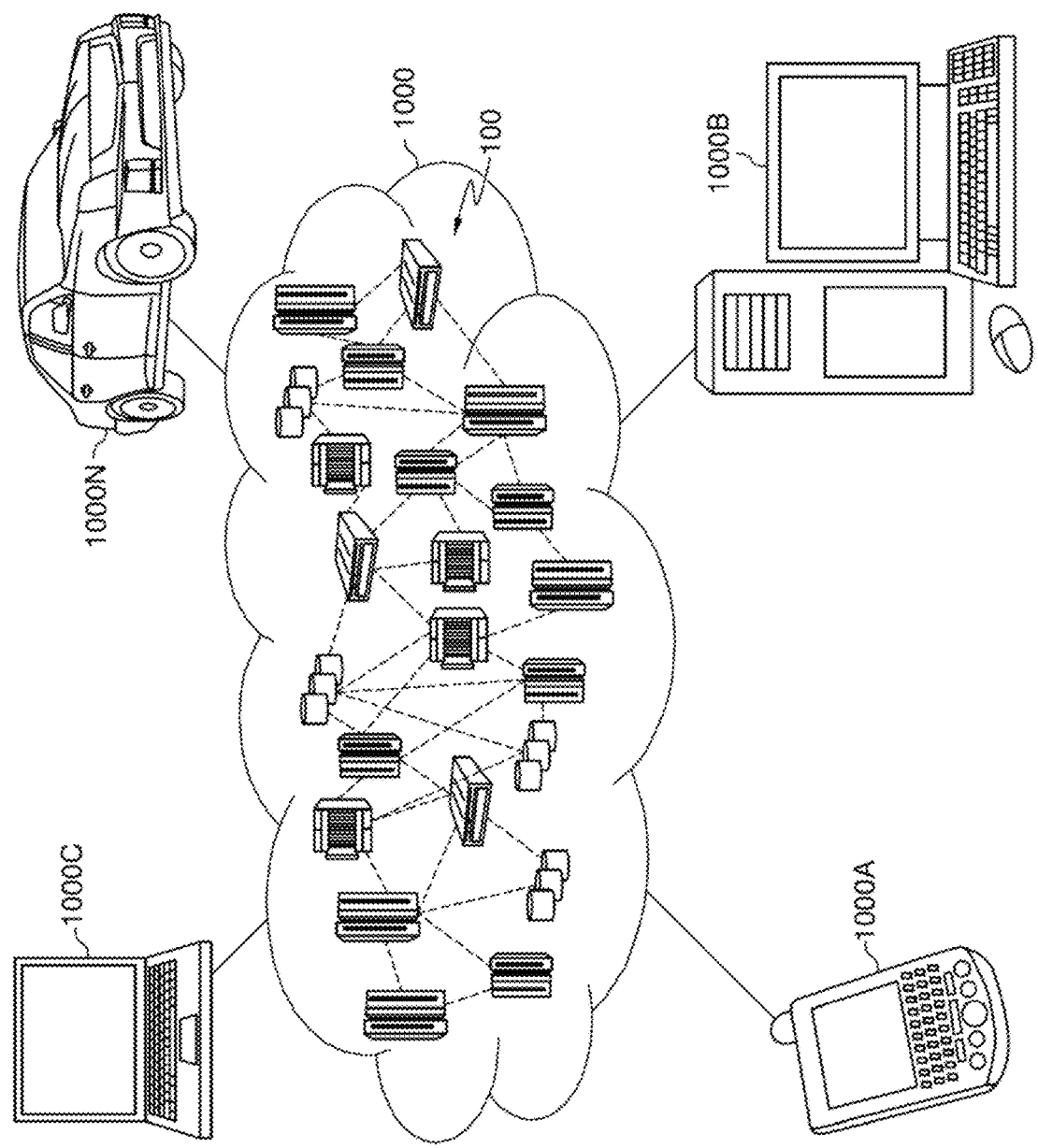
FIG. 10 is a block diagram of an illustrative cloud computing environment including the computer system depicted in FIG. 1, in accordance with an embodiment of the present disclosure.

Referring now to FIG. 10, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 10 are intended to be illustrative only and that computing nodes 100 and cloud computing environment 1000 can communicate with any type of computerized device over any type of network and/or network addressable connection (e.g., using a web browser).

Figure 11:
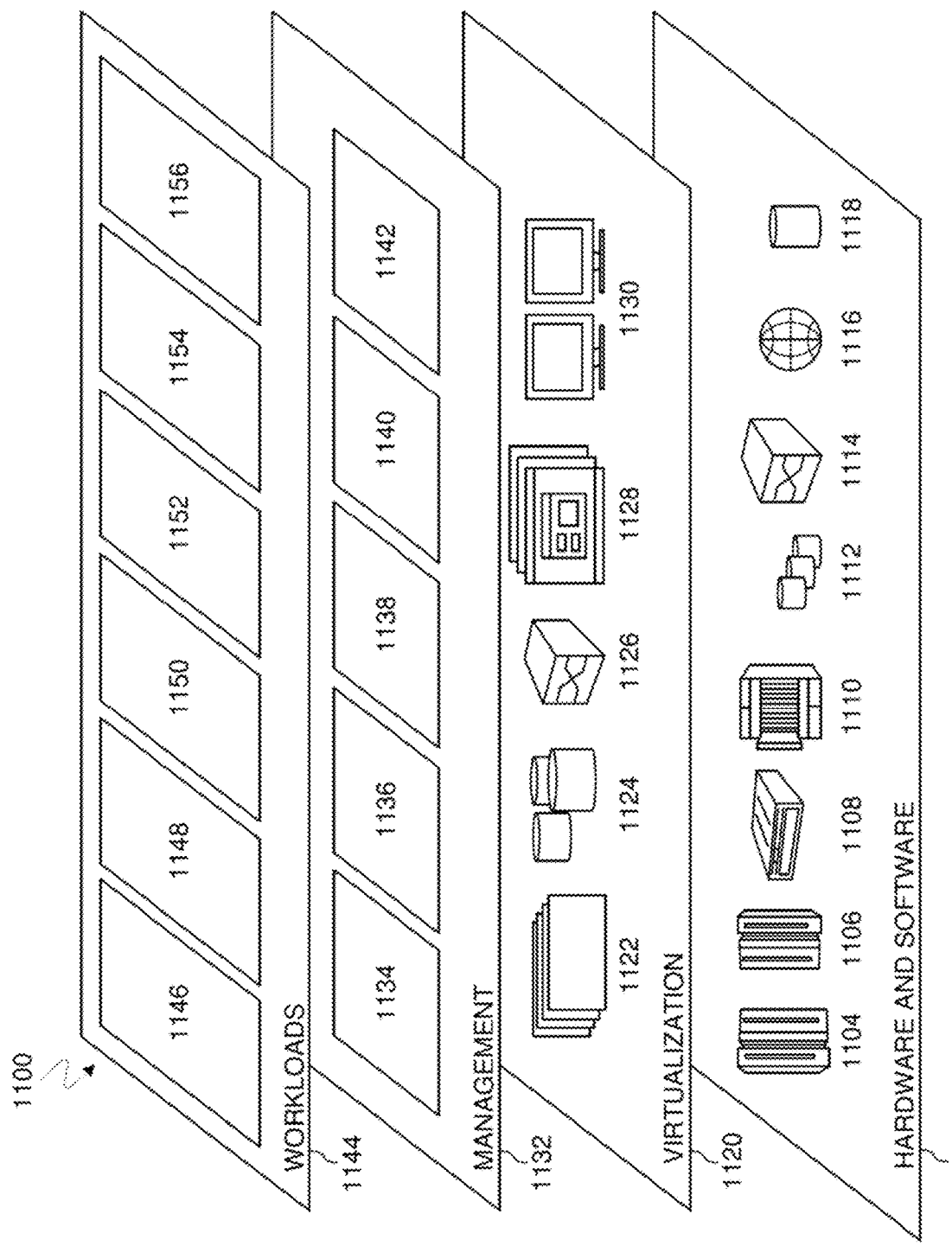
FIG. 11 is a block diagram of functional layers of the illustrative cloud computing environment of FIG. 10, in accordance with an embodiment of the present disclosure.

Referring now to FIG. 11, a set of functional abstraction layers 1100 provided by cloud computing environment 1000 is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1106; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and dynamic graphing 1156. A dynamic graphing program 110a, 110b provides a way for a user to dynamically control which portions of a distributed network are depicted in a sub-graph in order to facilitate more precise system analysis.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed hemin.

What is claimed is:

1. A method for dynamic viewing of an operation graph depicting a distributed workload in an Information Technology system, the method comprising:
   generating a global graph via:
      extracting, via a computer system, operations objects and dependencies of the operations objects from raw data received from the distributed workload, wherein the extracting the operations objects comprises:

parsing, via the computer system, the received raw data into a key-value format organized with a respective key-value pair per line;

performing data profiling of entries of the parsed data in the key-value format to produce descriptive statistics regarding the parsed data;

inputting at least one of the parsed data and the descriptive statistics into a machine learning model that, in response, outputs one or more suggestions of new types of operations entities;

extracting, via the computer system, fields representing operations entities from the parsed raw data that are in the key-value format; and mapping, via the computer system, the operations entities to the operations objects;

wherein the extracting the dependencies comprises:
grouping the operations objects into groups based on temporal occurrence of the raw data;

determining a sequential order of the operations objects within the respective groups based on time information provided with the raw data; and capturing dependent operations objects based on the sequential order, the capturing comprising determining a respective dependency probability between the operations objects;

receiving as input, via the computer system, a list comprising selected nodes;

abstracting, via the computer system, a sub-graph from the global graph, wherein the sub-graph and the global graph depict interactions among the operations objects of the distributed workload using nodes and edges, the edges are based on the extracted dependencies and indicate the determined dependency probabilities, and the abstracting the sub-graph from the global graph comprises:

removing first nodes from the global graph according to the list;

maintaining direct edges between remaining nodes from the global graph; and in response to the removing of the first nodes, generating a first indirect edge based on the removed first nodes, wherein the first indirect edge runs between a first remaining node and a second remaining node, wherein the direct edges in the sub-graph comprise a first line presentation form and the first indirect edge in the sub-graph comprises a second line presentation form different from the first line presentation form;

presenting, via the computer system, the sub-graph removed from the global graph; and after the presenting of the sub-graph, receiving, via the computer system, an entry of an IT operation for the distributed workload or a maintenance action for the distributed workload.

2. The method according to claim 1, further comprising generating the global graph via receiving, via the computer system, the raw data from the distributed workload.

3. The method according to claim 1, wherein the grouping of the operations objects further includes identifier-based grouping comprising string-based searching of names of the operations entries to the operations objects.

4. The method according to claim 1, wherein the list is an allow list, and wherein the selected nodes are included in the sub-graph as the remaining nodes.

5. The method according to claim 1, wherein the list is a block list, and wherein the selected nodes are the first nodes.

6. The method according to claim 1, wherein the list comprises an allow list and a block list, wherein the allow list comprises to-be-allowed nodes, wherein the block list comprises to-be-blocked nodes, wherein the to-be-allowed nodes are included in the sub-graph as the remaining nodes, and wherein the to-be-blocked nodes are the first nodes.

7. The method according to claim 1, wherein the global graph comprises a first global graph node, a second global graph node, a third global graph node, a first global graph direct edge between the first global graph node and the second global graph node, and a second global graph direct edge between the second global graph node and the third global graph node, wherein the first global graph direct edge and the second global graph direct edge are each directed in a first path direction;

wherein the second global graph node is removed as one of the removed first nodes;

wherein the abstracting the sub-graph from the global graph further comprises removing the first global graph direct edge and the second global graph direct edge;

wherein, after the removing of the first nodes, the first global graph node and the third global graph node are first and second remaining nodes, respectively, of the remaining nodes; and wherein the first indirect edge runs between the first remaining node and the second remaining node in the sub-graph.

8. The method according to claim 1, wherein the global graph comprises a first global graph node, a second global graph node, a third global graph node, a fourth global graph node, a first global graph direct edge between the first global graph node and the second global graph node, a second global graph direct edge between the second global graph node and the third global graph node, and a third global graph direct edge between the third global graph node and the fourth global graph node, wherein the first global graph direct edge, the second global graph direct edge, and the third global graph direct edge are each directed in a first path direction;

wherein the second global graph node and the third global graph node are removed as two of the removed first nodes;

wherein the abstracting the sub-graph from the global graph further comprises removing the first global graph direct edge, the second global graph direct edge, and the third global graph direct edge;

wherein, after the removing of the first nodes, the first global graph node and the fourth global graph node are first and second remaining nodes, respectively, of the remaining nodes; and wherein the first indirect edge runs between the first remaining node and the second remaining node in the sub-graph.

9. The method according to claim 1, wherein the abstracting the sub-graph from the global graph further comprises:

in a step A, determining whether a removed first node was an intermediate node between the first and the second remaining nodes along an accessible path of the global graph; and in response to an affirmative determination of step A, in a step B determining whether an edge is already present between the first and the second remaining nodes along another path;

wherein the generating of the first indirect edge is performed in response to a negative determination of step B.

10. The method according to claim 1, wherein the abstracting the sub-graph from the global graph further comprises:

in a step A, determining whether the removing of the first nodes disrupted an accessible path of the global graph between the remaining nodes;
wherein the generating of the first indirect edge reestablishes the accessible path in response to an affirmative determination of step A.

11. The method according to claim 1, wherein the first indirect edge presents information about an original accessible path between the first remaining node and the second remaining node in the global graph.

12. The method according to claim 1, wherein the first line presentation form comprises one of a dotted line form or a solid line form, and wherein the second line presentation form comprises the other of the dotted line form or the solid line form.

13. A computer system for dynamic viewing of an operation graph depicting a distributed workload in an Information Technology system, the computer system comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
generating a global graph via:
extracting operations objects and dependencies of the operations objects from raw data received from the distributed workload, wherein the extracting the operations objects comprises:
parsing the received raw data into a key-value format organized with a respective key-value pair per line;
performing data profiling of entries of the parsed data in the key-value format to produce descriptive statistics regarding the parsed data;
inputting at least one of the parsed data and the descriptive statistics into a machine learning model that, in response, outputs one or more suggestions of new types of operations entities;
extracting fields representing operations entities from the parsed raw data that are in the key-value format; and
mapping the operations entities to the operations objects;
wherein the extracting the dependencies comprises:
grouping the operations objects into groups based on temporal occurrence of the raw data;
determining a sequential order of the operations objects within the respective groups based on time information provided with the raw data; and
capturing dependent operations objects based on the sequential order, the capturing comprising determining a respective dependency probability between the operations objects;
receiving as input a list comprising selected nodes;
abstracting a sub-graph from the global graph, wherein the sub-graph and the global graph depict interactions among the operations objects of the distributed workload using nodes and edges, the edges are based on the extracted dependencies and indicate the determined dependency probabilities, and the abstracting the sub-graph from the global graph comprises:
removing first nodes from the global graph according to the list;
maintaining direct edges between remaining nodes from the global graph; and
in response to the removing of the first nodes, generating a first indirect edge based on the removed first nodes, wherein the first indirect edge runs between a first remaining node and a second remaining node, and wherein the direct edges in the sub-graph comprise a first line presentation form and the first indirect edge in the sub-graph comprises a second line presentation form different from the first line presentation form;
presenting the sub-graph removed from the global graph; and
after the presenting of the sub-graph, receiving an entry of an IT operation for the distributed workload or a maintenance action for the distributed workload.

14. The computer system of claim 13, wherein the first line presentation form is one of a dotted line form and a solid line form, and wherein the second line presentation form is the other of the dotted line form and the solid line form.

15. The method according to claim 1, wherein the key-value format comprises a first segment and a second segment adjacent to the first segment, the first segment indicating keys and the second segment indicating respective values for the keys.

16. The method according to claim 1, wherein the extracting the operations objects further comprises identifying the operations entities based on the descriptive statistics.

17. The method according to claim 1, wherein the extracting the operations objects further comprises:
identifying patterns in the parsed data in the key-value format; and
identifying the operations entities by comparing, in an automated manner, the identified patterns to stored patterns that are stored in a computer database.

18. The computer system of claim 13, wherein the first indirect edge presents information about an original accessible path between the first remaining node and the second remaining node in the global graph.

19. A computer program product for dynamic viewing of an operation graph depicting a distributed workload in an Information Technology system, the computer program product comprising a computer-readable storage medium having program instructions embodied therewith, wherein the program instructions are executable by a computer to cause the computer to perform a method comprising:
generating a global graph via:
extracting operations objects and dependencies of the operations objects from raw data received from the distributed workload, wherein the extracting the operations objects comprises:
parsing the received raw data into a key-value format organized with a respective key-value pair per line;
performing data profiling of entries of the parsed data in the key-value format to produce descriptive statistics regarding the parsed data;
inputting at least one of the parsed data and the descriptive statistics into a machine learning model that, in response, outputs one or more suggestions of new types of operations entities;
extracting fields representing operations entities from the parsed raw data that are in the key-value format; and
mapping the operations entities to the operations objects;

wherein the extracting the dependencies comprises:
grouping the operations objects into groups based on temporal occurrence of the raw data;
determining a sequential order of the operations objects within the respective groups based on time information provided with the raw data; and
capturing dependent operations objects based on the sequential order, the capturing comprising determining a respective dependency probability between the operations objects;

receiving as input a list comprising selected nodes;
abstracting a sub-graph from the global graph, wherein the sub-graph and the global graph depict interactions among the operations objects of the distributed workload using nodes and edges, the edges are based on the extracted dependencies and indicate the determined dependency probabilities, and the abstracting the sub-graph from the global graph comprises:
removing first nodes from the global graph according to the list;
maintaining direct edges between remaining nodes from the global graph;
in response to the removing of the first nodes, generating a first indirect edge based on the removed first nodes, wherein the first indirect edge runs between a first remaining node and a second remaining node, and wherein the direct edges in the sub-graph comprise a first line presentation form and the first indirect edge in the sub-graph comprises a second line presentation form different from the first line presentation form;
presenting the sub-graph removed from the global graph; and
after the presenting of the sub-graph, receiving an entry of an IT operation for the distributed workload or a maintenance action for the distributed workload.

20. The computer program product of claim 19, wherein the first line presentation form is one of a solid line form and a dotted line form, and the second line presentation form is the other of the solid line form and the dotted line form.

* * * * *